(12) United States Patent
Zhou et al.

(10) Patent No.: US 11,275,927 B2
(45) Date of Patent: Mar. 15, 2022

(54) METHOD AND DEVICE FOR PROCESSING IMAGE, COMPUTER READABLE STORAGE MEDIUM AND ELECTRONIC DEVICE

(71) Applicant: GUANGDONG OPPO MOBILE TELECOMMUNICATIONS CORP., LTD., Guangdong (CN)

(72) Inventors: Haitao Zhou, Guangdong (CN); Ziqing Guo, Guangdong (CN); Kamwing Au, Guangdong (CN); Fangfang Hui, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 369 days.

(21) Appl. No.: 16/671,856

(22) Filed: Nov. 1, 2019

(65) Prior Publication Data

US 2020/0065562 A1   Feb. 27, 2020

Related U.S. Application Data

(63) Continuation of application No. PCT/CN2019/083260, filed on Apr. 18, 2019.

(30) Foreign Application Priority Data

Apr. 28, 2018 (CN) .......................... 201810403000.4
Apr. 28, 2018 (CN) .......................... 201810404509.0

(51) Int. Cl.
*H04L 29/06*   (2006.01)
*G06K 9/00*    (2022.01)
(Continued)

(52) U.S. Cl.
CPC ......... *G06K 9/00281* (2013.01); *G06F 21/32* (2013.01); *G06K 9/00255* (2013.01);
(Continued)

(58) Field of Classification Search
CPC ............ G06K 9/00281; G06K 9/00255; G06T 7/521; G06T 2207/10048; G06F 21/32;
(Continued)

(56) References Cited

U.S. PATENT DOCUMENTS

2011/0025827 A1* 2/2011 Shpunt ..................... H04N 5/33
                                                           348/47
2014/0112574 A1   4/2014 Kim et al.
(Continued)

FOREIGN PATENT DOCUMENTS

CN        1737820 A     2/2006
CN      103268608 A     8/2013
(Continued)

OTHER PUBLICATIONS

English translation of OA for CN application 201810404509.0.
(Continued)

*Primary Examiner* — Evans Desrosiers
(74) *Attorney, Agent, or Firm* — Young Basile Hanlon & MacFarlane, P.C.

(57) ABSTRACT

A method for processing an image, a non-transitory computer readable storage medium and an electronic device are provided. The method includes: in response to detecting an image capturing instruction, determining a security of an application operation corresponding to the image capturing instruction; and capturing an image corresponding to a determination result based on the determination result.

17 Claims, 11 Drawing Sheets

(51) Int. Cl.
    *G06T 7/521*     (2017.01)
    *G06F 21/32*     (2013.01)

(52) U.S. Cl.
    CPC ............ *G06T 7/521* (2017.01); *H04L 63/105* (2013.01); *G06F 2221/2113* (2013.01); *G06F 2221/2151* (2013.01); *G06T 2207/10048* (2013.01)

(58) Field of Classification Search
    CPC ....... G06F 221/2113; G06F 2221/2151; H04L 63/105
    USPC .......................................................... 713/186
    See application file for complete search history.

(56) References Cited

U.S. PATENT DOCUMENTS

| | | | | |
|---|---|---|---|---|
| 2016/0178355 | A1* | 6/2016 | Ge | G06K 9/2036 348/136 |
| 2018/0336399 | A1* | 11/2018 | Gernoth | G06F 15/76 |

FOREIGN PATENT DOCUMENTS

| | | |
|---|---|---|
| CN | 104239816 A | 12/2014 |
| CN | 106331462 A | 1/2017 |
| CN | 107077607 A | 8/2017 |
| CN | 107292283 A | 10/2017 |
| CN | 107341481 A | 11/2017 |
| CN | 108804895 A | 11/2018 |
| CN | 108830141 A | 11/2018 |

OTHER PUBLICATIONS

Extended European Search Report for EP application 19791784.2 dated Oct. 19, 2020.
English translation of First OA for CN application 201810403000.4 dated Dec. 11, 2019.
English translation of Second OA for CN application 201810404509.0 dated Apr. 1, 2020.
English translation of Second OA for CN application 201810403000.4 dated Apr. 1, 2020.
Indian Examination Report for IN Application 201917049159 dated May 21, 2021. (7 pages).
ISR with English Translation issued for PCT application PCT/CN2019/083260, dated May 30, 2019.
Research on TrustZone-Based Security Scheme for TEE; Journal of Beijing Electronic Science and Technology Institute; Jun. 2016; 7 pages.
Third OA with English translation for CN application 201810404509.0 dated Jul. 3, 2020.

* cited by examiner

502 — obtaining a network security level of a network environment where the electronic device is currently in 504 — obtaining an encryption level based on the network security level, and encrypting the result of the human face recognition based on the encryption level

```
                                                                    ┌── 0136
obtaining an execution environment where the electronic device is currently in │                                ┌── 0137
                                    ▼
in response to detecting that the electronic device is currently in a security execution
environment, performing the human face recognition based on the target image under
                        the security execution environment │                                ┌── 0138
                                    ▼
In response to detecting that the electronic device is currently in a non-security
execution environment, switching the execution environment of the electronic device
from the non-security execution environment to the security execution environment,
performing the human face recognition processing based on the target image under the
                        security execution environment
```

FIG. 7

```
                                                                    ┌── 021
in response to detecting an image capturing instruction, determining
whether an application operation corresponding to the image capturing
                    instruction is a non-secure operation │                                ┌── 022
                                    ▼
in response to determining that the application operation corresponding to
  the image capturing instruction is the non-secure operation, controlling
    the camera module to capture the speckle image based on the image
                        capturing instruction │                                ┌── 023
                                    ▼
acquiring a depth image through a calculation based on the speckle image │                                ┌── 024
                                    ▼
   sending the depth image to the target application initiating the image
capturing instruction, the depth image is configured to instruct the target
              application to execute the application operation
```

FIG. 8

METHOD AND DEVICE FOR PROCESSING IMAGE, COMPUTER READABLE STORAGE MEDIUM AND ELECTRONIC DEVICE

CROSS-REFERENCE TO RELATED APPLICATION(S)

The present application is a continuation application of International Application No. PCT/CN2019/083260, filed on Apr. 18, 2019, which claims priorities to Chinese Patent Applications Nos. 201810404509.0 and 201810403000.4, both filed on Apr. 28, 2018, the entire contents of all of which are incorporated herein by reference in their entireties.

TECHNICAL FIELD

The present disclosure relates to a field of computer technologies, and more particularly, to a method and a device for processing an image, a computer readable storage medium and an electronic device.

BACKGROUND

Due to uniqueness of a human face, human face recognition technology is more and more widely used in smart terminals. Many applications on the smart terminals may require authentication with the human face, for example, unlocking the smart terminal with the human face, performing payment authentication with the human face, and the like. Meanwhile, the smart terminal may also process an image containing the human face, e.g., recognizing facial features to make an emoticon based on a facial expression, or beautify the face based on the facial features.

SUMMARY

Embodiments of the present disclosure provide a method, a non-transitory computer readable storage medium and an electronic device.

The method for processing an image according to embodiments of the present disclosure includes: in response to detecting an image capturing instruction, determining a security of an application operation corresponding to the image capturing instruction; and capturing an image corresponding to a determination result based on the determination result.

The non-transitory computer readable storage medium according to embodiments of the present disclosure has a computer program stored thereon. When the computer program is executed by a processor, the method for processing an image described above is executed.

The electronic device according to embodiments of the present disclosure includes a memory and a processor. The memory has a computer readable instruction stored thereon. When the instruction is executed by the processor, the processor is configured to execute the method for processing an image described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

In order to clearly illustrate technical solutions of embodiments of the present disclosure or in the prior art, a brief description of drawings used in embodiments or the prior art is given below. Obviously, the drawings in the following descriptions are only part embodiments of the present disclosure, and for those skilled in the art, other drawings can be obtained according to these drawings without creative labor.

FIG. 7 is a flowchart illustrating a method for processing an image according to some embodiments of the present disclosure.

FIG. 8 is a flowchart illustrating a method for processing an image according to some embodiments of the present disclosure.

DETAILED DESCRIPTION

In order to make the objects, technical solutions and advantages of the present disclosure more apparent, the present disclosure will be described in further detail below with reference to the accompanying drawings and embodiments. It should be understood, the specific embodiments described herein are only used to explain the present disclosure rather than to limit the present disclosure.

It will be understood that the terms "first", "second" and the like as used herein may be used to describe various elements, but these elements are not limited by these terms. These terms are only used to distinguish one element from another. For example, a first client may be referred to as a second client, and similarly, the second client may be referred to as the first client, without departing from the scope of the present disclosure. Both the first client and the second client are clients, but they are not the same client.

Figure 1:
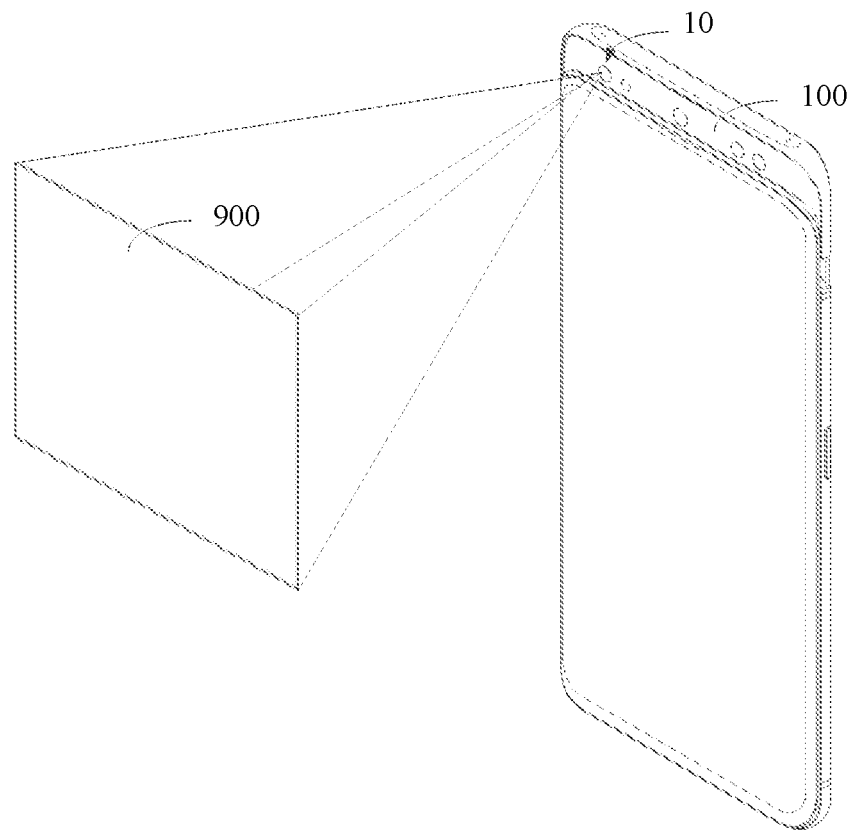
FIG. 1 is a schematic diagram illustrating an application scenario of a method for processing an image according to some embodiments of the present disclosure.

FIG. 1 is a schematic diagram illustrating an application scenario of a method for processing an image according to some embodiments of the present disclosure. As illustrated in FIG. 1, the application scenario may include an electronic device 100. A camera component 10 may be mounted on the electronic device 100, and several applications may also be mounted on the electronic device 100. In response to detecting by the electronic device 100 an image capturing instruction, the electronic device 100 may determine a security of an application operation corresponding to the image capturing instruction and capture an image corresponding to a determination result based on the determination result. The electronic device 100 may be a smart phone, a tablet computer, a personal digital assistant, a wearable device, or the like.

In an example, in response to detecting the image capturing instruction by the electronic device 100, the electronic device 100 may determine whether the application operation corresponding to the image capturing instruction is a secure operation or not. In response to determining that the application operation corresponding to the image capturing instruction is the secure operation, a camera component 10 may be controlled to capture an infrared image and a speckle image 900 based on the image capturing instruction. A target image may be acquired based on the infrared image and the speckle image 900. Human face recognition may be performed based on the target image in a secure execution environment. A result of the human face recognition may be sent to a target application initiating the image capturing instruction. The result of the human face recognition may be used for indicating the target application to execute the application operation.

In another example, in response to detecting the image capturing instruction, the electronic device 100 may determine whether the application operation corresponding to the image capturing instruction is a non-secure operation. In response to determining that the application operation corresponding to the image capturing instruction is the non-secure operation, the camera component 10 may be controlled to capture the speckle image 900 based on the image capturing instruction. A depth image may be obtained through a calculation based on the speckle image 900. The depth image may be sent to the target application initiating the image capturing instruction. The target application may be configured to execute the application operation based on the depth image.

Figure 2:
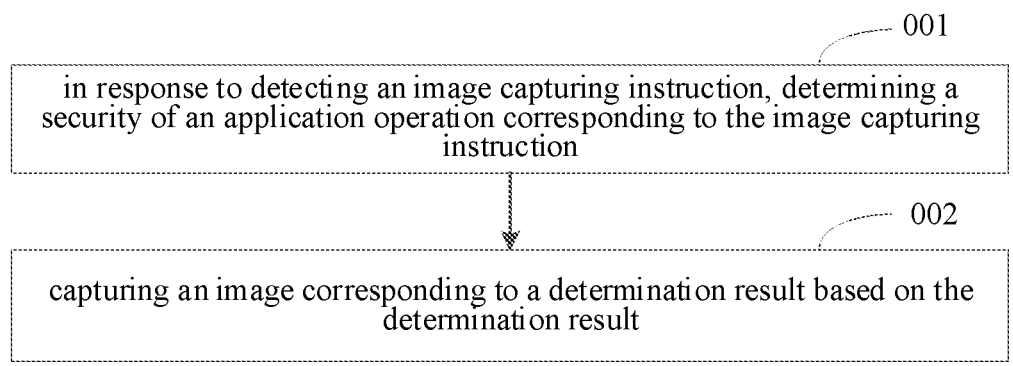
FIG. 2 is a flowchart illustrating a method for processing an image according to some embodiments of the present disclosure.

As illustrated in FIG. 2, the present disclosure provides a method for processing an image. The method for processing an image may include the following.

At block 001, in response to detecting an image capturing instruction, a security of an application operation corresponding to the image capturing instruction is determined.

At block 002, an image corresponding to a determination result is captured based on the determination result.

Figure 3:
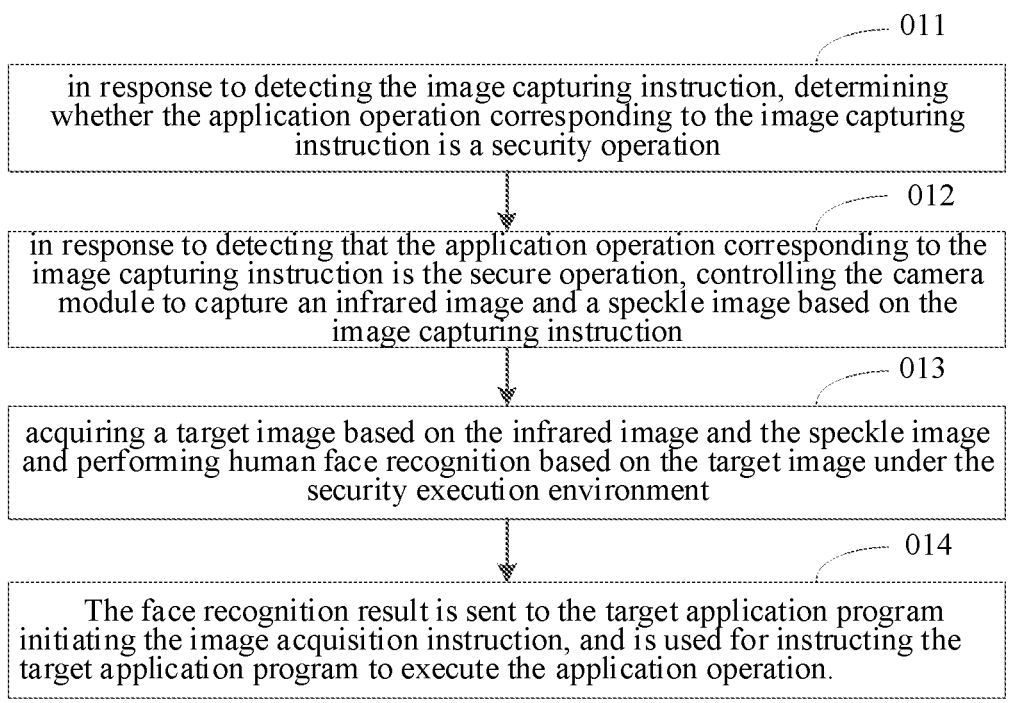
FIG. 3 is a flowchart illustrating a method for processing an image according to some embodiments of the present disclosure.
Figure 12:
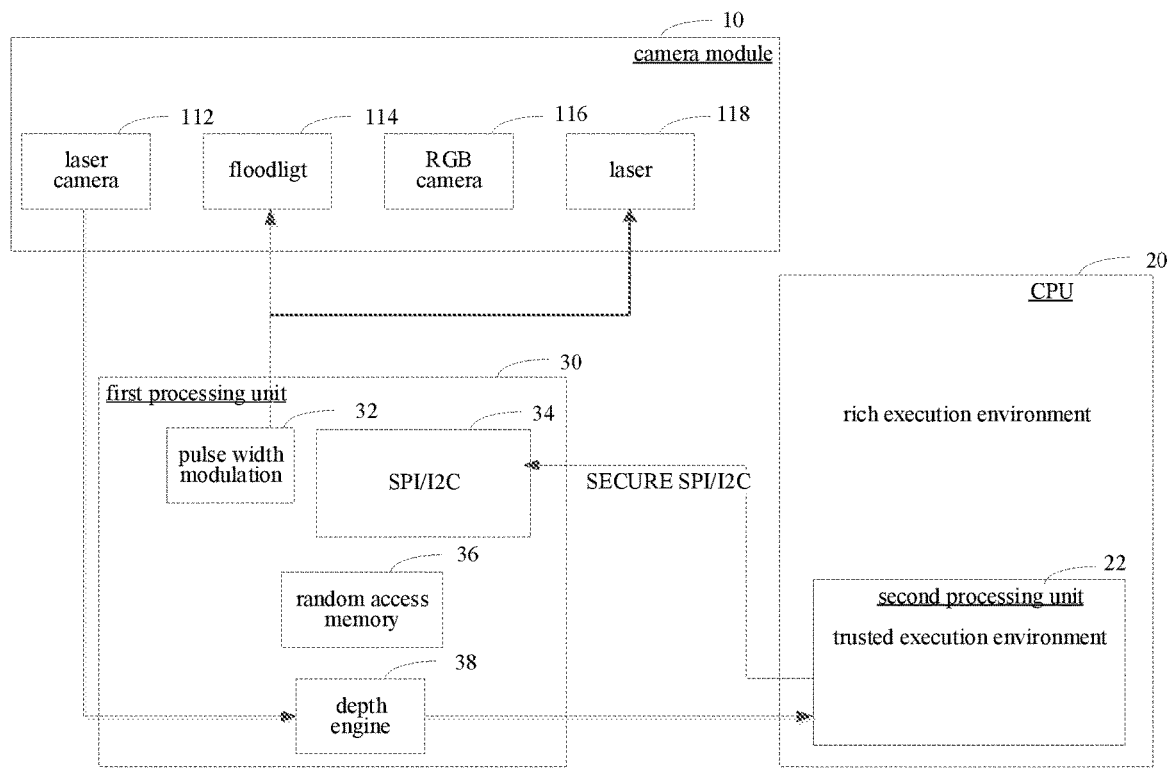
FIG. 12 is a schematic diagram illustrating a hardware structure for implementing a method for processing an image according to some embodiments of the present disclosure.

As illustrated in FIGS. 1, 3 and 12, in an example, the block 001 may include a block 011, and the block 002 may include a block 012. The method for processing an image may include blocks 011 to 014.

At block 011, in response to detecting the image capturing instruction, it is determined whether the application operation corresponding to the image capturing instruction is a secure operation.

In an embodiment, the camera component 10 may be mounted on the electronic device 100. A camera contained in the camera component 10 may be configured to capture an image. The camera may include a laser camera 112, a visible camera depending on images to be captured. The laser camera 112 may be configured to capture an image of an object illuminated by laser light. The visible camera may be configured to capture an image of an object illuminated by visible light. Several cameras may be mounted on the electronic device 100, and mounting positions may be not limited. For example, one camera may be mounted on a front panel of the electronic device 100, while two cameras may be mounted on a rear panel. In some examples, the camera may be embedded into the electronic device 100 and may be activated in a rotation or sliding manner. In detail, the electronic device 100 may be provided with a front camera and a rear camera. The front camera and the rear camera may be configured to capture images from different views of field. Generally, the front camera may be configured to capture an image from a front view of the electronic device 100, while the rear camera may be configured to capture an image from a rear view of the electronic device 100.

The image capturing instruction may refer to an instruction for triggering an image capturing operation. For example, when a user unlocks a smart phone, the user may be verified to unlock the smart phone by capturing a facial image. When a user performs a payment operation through the smart phone, the facial image may be authenticated. The application may refer to an operation to be executed by an application. When the application is opened by a user, various application operations may be executed by the application. For example, the application operation may be a payment operation, a photographing operation, an unlocking operation, a game operation, or the like. An application operation requiring a high security may be determined as the secure operation, and an application operation requiring a low security may be determined as the non-secure operation.

At block 012, in response to determining that the application operation corresponding to the image capturing instruction is the secure operation, the camera component 10 is controlled to capture an infrared image and a speckle image based on the image capturing instruction.

A processing unit of the electronic device 100 may be configured to receive an instruction from an upper-level application. In response to receiving the image capturing instruction by the processing unit, the processing unit may be configured to control the camera component 10 to capture the infrared image and the speckle image via a camera. The processing unit may be connected to the camera. The image captured by the camera may be transmitted to the processing unit. The image may be processed by the processing unit. For example, the image may be subjected to cutting, brightness adjustment, human face detection and human face recognition. In detail, the camera component 10 may include, but be not limited to, a laser camera 112, a laser 118, and a floodlight 114. In response to receiving by the processing unit, the image capturing instruction, the processing unit may be configured to control to power on the laser 118 and the floodlight 114 in a time division manner. In response to determining that the laser 118 is powered on, the speckle image 900 may be captured by the laser camera 112. In response to determining that the floodlight 114 is powered on, the infrared image may be captured by the laser camera 112.

It may be appreciated that when laser light is directed onto an optically rough surface having an average undulation greater than a magnitude of a wavelength, wavelets scattered by randomly distributed surface panels on these surfaces may be superimposed on each other, such that a reflected light field has a random spatial light intensity distribution and presents a grainy structure, which are laser speckles. The laser speckles may have a high randomness, and thus the laser speckles generated by the laser light emitted by different laser emitters (i.e., the laser 118) are different. Speckle images 900 generated are different in cases where the formed laser speckles reach onto objects of different depths and shapes. The laser speckles formed by a laser emitter 112 are unique and the obtained speckle image 900 is unique. The laser speckles formed by the laser 118 may reach onto an object, such that the speckle image 900 of the object illuminated by the laser speckles may be captured by the laser camera 112.

In detail, the electronic device 100 may include a first processing unit 30 and a second processing unit 22. Both the first processing unit 30 and the second processing unit 22 may operate in a secure execution environment. The secure execution environment may include a first secure environment and a second secure environment. The first processing unit 30 may operate under the first secure environment and the second processing unit 22 may operate under the second secure environment. The first processing unit 30 and the second processing unit 22 may be processing units provided on different processors and may operate under different secure environments. For example, the first processing unit 30 may be an external MCU (microcontroller unit) module or a secure processing module in a DSP (digital signal processing). The second processing unit 22 may be a CPU (central processing unit) core in a TEE (trust execution environment).

The CPU of the electronic device 100 may operation in two modes including the TEE and a REE (rich execution environment). Generally, the CPU may operate under the REE. In a case where the electronic device 100 needs to obtain data with a high security level, for example, in a case where the electronic device 100 needs to acquire the data about human face for identification and verification, the CPU may operate under the TEE by switching the execution environment from the REE. In a case where the CPU of the electronic device 100 is a single-core CPU, the single-core CPU may operation under the TEE by switching the execution environment from the REE. In a case where the CPU of the electronic device 100 is a multi-core CPU, the electronic device 100 may switch the execution environment from the REE to the TEE for one core, while the remaining cores operate under the REE.

At block 013, a target image is acquired based on the infrared image and the speckle image 900, and a human face recognition is performed based on the target image in the secure execution environment.

In an embodiment, the target image may include the infrared image and the depth image. The image capturing instruction initiated by the target application may be sent to the first processing unit 30. In response to detecting by the first processing unit 22 that the application operation corresponding to the image capturing instruction is the secure operation, the camera component 10 may be controlled to capture the speckle image 900 and the infrared image and to calculate the depth image based on the speckle image 900. The depth image and the infrared image may be sent to the second processing unit 22. The second processing unit 22 may be configured to perform the human face recognition based on the depth image and the infrared image.

It may be appreciated that the laser 118 may be configured to emit several laser speckles. In a case where the laser speckles reach onto objects at different distances, positions of speckles presented on images may be different. The electronic device 100 may capture a standard reference image in advance. The reference image may be an image of a plane at a certain distance illuminated by the laser speckles. Generally, the speckles on the reference image may be evenly distributed. The electronic device 100 may establish a correspondence between each speckle on the reference image and a respective reference depth. It may be understood that the speckles in the reference image may be unevenly scattered, which may be not limited herein. In a case where the speckle image 900 needs to be acquired, the electronic device 100 may control the laser 118 to emit the laser speckles. After the laser speckles reach onto an object, the speckle image 900 may be captured by the laser camera 112. Each speckle of the speckle image 900 may be compared with a respective speckle of the reference image to obtain a position offset of the speckle of the speckle image 900 relative to the corresponding speckle of the reference image. Actual depth information corresponding to the speckle may be obtained based on the position offset of the speckle and the reference depth.

The infrared image captured by the laser camera 112 may correspond to the speckle image 900. The speckle image 900 may be configured to calibrate the depth information corresponding to each pixel of the infrared image. In this manner, the human face may be detected and recognized with the infrared image. The depth information corresponding to the human face may be obtained through a calculation based on the speckle image 900. In detail, in the process of calculating the depth information based on the speckle image 900, a relative depth may be obtained through a calculation based on the position offset of the speckle of the speckle image 900 relative to the reference image. The relative depth may indicate depth information from the object captured to a reference plane. The actual depth information of the object may be obtained through a calculation based on the relative depth and the reference depth. The depth image may be configured to indicate depth information corresponding to the infrared image. The depth information may indicate the relative depth of the object from the reference plane or an absolute depth of the object from the camera.

The human face recognition may refer to a processing for recognizing a human face contained in an image. In detail, human face detection processing may be performed based on the infrared image to extract a region containing the human face from the infrared image. The extracted human face may be identified to distinguish the identity of the human face. The depth image may correspond to the infrared image. The depth information corresponding to the human face may be obtained based on the depth image, to determine whether the human face is a living body or not. With the human face recognition, the identity of the human face obtained currently may be authenticated.

At block 014, a result of the human face recognition is sent to the target application initiating the image capturing instruction. The result of the human face recognition is configured to indicate the target application to execute the application operation.

The second processing unit 22 may be configured to perform the human face recognition based on the depth image and the infrared image. The result of the human face recognition may be sent the target application that initiates the image capturing instruction. It may be understood that in response to generating the image capturing instruction by the target application, the target application may write a target application identifier, an instruction initiation time, a type of the captured image, and the like into the image capturing instruction. In response detecting by the electronic device 100 the image capturing instruction, the target application may be obtained based on the target application identifier contained in the image capturing instruction.

The result of the human face recognition may include a human face matching result and a living-body detection result. The human face matching result may be configured to indicate whether the human face contained in the image matches a preset human face. The living-body detection result may be configured to indicate whether the human face contained in the image is a human face of a living body. The target application may be configured to execute an application operation based on the result of the human face recognition. For example, the unlocking may be performed based on the result of the human face recognition. In response to detecting that the human face contained in the captured image matches with the preset human face and the human face is the human face of a living body, a locking state of the electronic device 100 may be released.

With the method for processing an image according to embodiments illustrated as FIG. 3, in response to detecting the image capturing instruction, it is determined whether the application operation corresponding to the image capturing instruction is the secure operation. In response to determining that the application operation corresponding to the image capturing instruction is the secure operation, the infrared image and the speckle image 900 are captured based on the image capturing instruction. The human face recognition is performed on the image under the secure execution environment. The result of the human face recognition is sent to the target application. Therefore, it may be guaranteed that during the secure operation, the target application may process the image in an environment with a high security level, thereby improving the security of processing the image.

Figure 4:
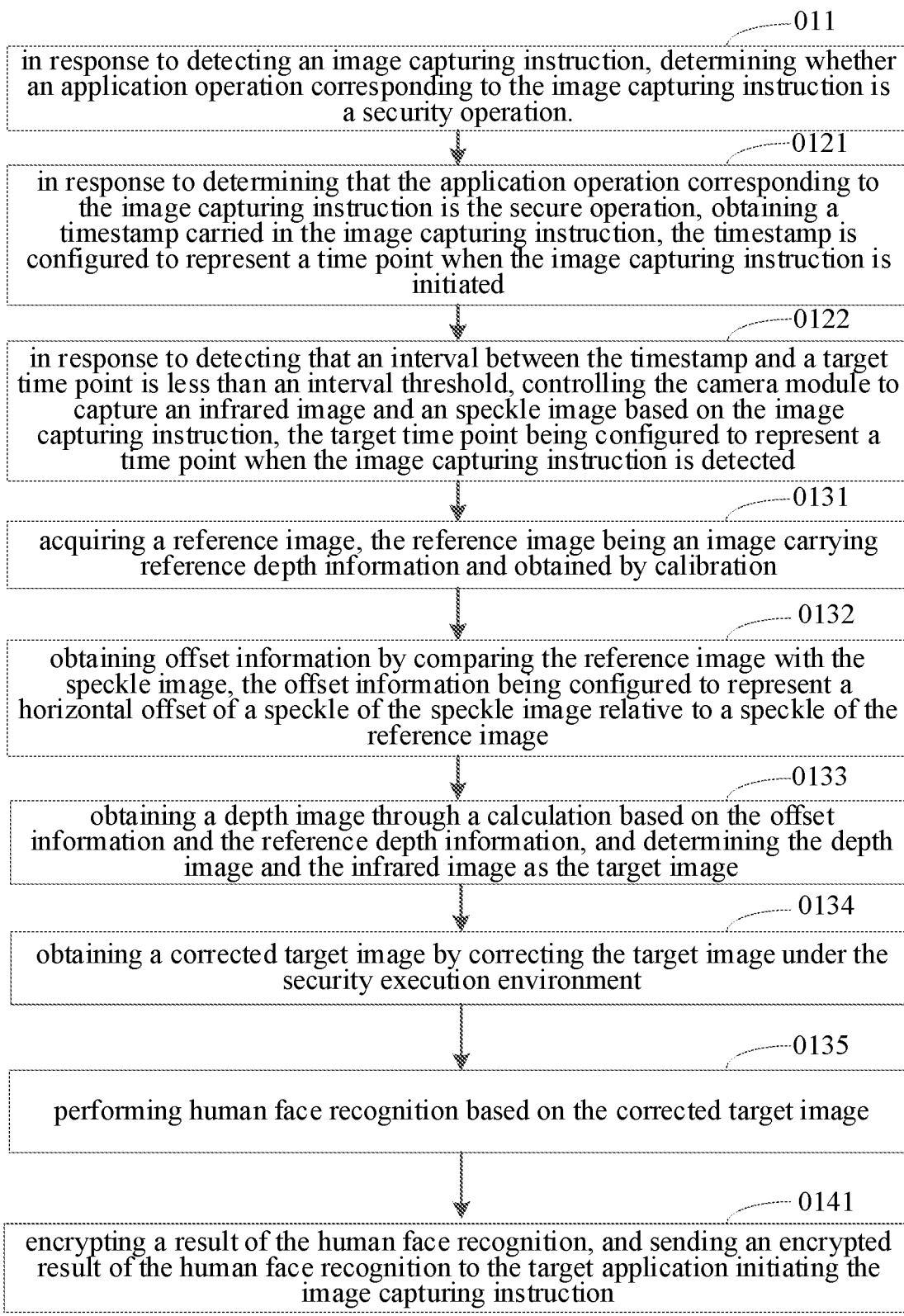
FIG. 4 is a flowchart illustrating a method for processing an image according to some embodiments of the present disclosure.

As illustrated in FIGS. 1, 4 and 12, in another example, the block 012 may include block 0121 and block 0122. The block 013 may include blocks 0131 to 0135. The block 014 may include block 0141.

At block 011, in response to detecting the image capturing instruction, it is determined whether the application operation corresponding to the image capturing instruction is the secure operation.

At block 0121, in response to determining that the application operation corresponding to the image capturing instruction is the secure operation, a timestamp included in the image capturing instruction is obtained. The timestamp is configured to represent a time point when the image capturing instruction is initiated.

In detail, in response to generating the image capturing instruction by the application, the application may write a timestamp in the image capturing instruction. The timestamp is configured to indicate the time point when the application initiates the image capturing instruction. In response to receiving by the first processing unit 30, the image capturing instruction, the first processing unit 30 may acquire the timestamp from the image capturing instruction and determine the time point when the image capturing instruction is generated based on the timestamp. For example, in response to initiating the image capturing instruction by the application, the application may read the time point recorded by a clock of the electronic device 100 as a timestamp and write the timestamp into the image capturing instruction. For example, in an Android system, system time may be obtained through a function System.currentTimeMillis( ).

At block 0122, in response to determining that an interval between the timestamp and a target time point is less than an interval threshold, the camera component 10 is controlled to capture the infrared image and the speckle image 900 based on the image capturing instruction. The target time point is configured to indicate a time point when the image capturing instruction is detected.

The target time point refers to a time point when the electronic device 100 detects the image capturing instruction. In detail, the target time point refers to a time point when the first processing unit 30 detects the image capturing instruction. The interval between the timestamp and the target time point refers to an interval from a time point when the image capturing instruction is initiated to a time point when the image capturing instruction is detected by the electronic device 100. In response to determining that the interval exceeds the interval threshold, it may be considered that a response to the instruction is abnormal. Capturing the image may be stopped and an abnormal message may be returned to the application. In response to determining that the interval is less than the interval threshold, the camera component 10 is controlled to capture the infrared image and the speckle image 900.

In an embodiment, the camera component 10 may be composed of a first camera component and a second camera component. The first camera component may be configured to capture the infrared image. The second camera component may be configured to capture the speckle image 900. In a case where the human face recognition is performed based on the infrared image and the speckle image 900, it may be required to ensure that the infrared image and the speckle image 900 correspond to each other. Thus, the camera component 10 needs to be controlled to capture the infrared image and the speckle image 900 simultaneously. In detail, the first camera component may be controlled to capture the infrared image based on the image capturing instruction. The second camera component may be controlled to capture the speckle image 900 based on the image capturing instruction. An interval between a first time point of capturing the infrared image and a second time point of capturing the speckle image may be less than a first threshold.

The first camera component may be composed of the floodlight 114 and the laser camera 112. The second camera component may be composed of the laser 118 and the laser camera 112. The laser camera 112 in the first camera component and the laser camera 112 in the second camera component may be the same laser camera or different laser cameras, which are not limited herein. In response to receiving by the first processing unit 30, the image capturing instruction, the first processing unit 30 may be configured to control the first camera component and the second camera component to operate. The first camera component and the second camera component may operate in parallel or in a time division manner, and a sequence of operating is not limited. For example, the first camera component may be controlled to capture the infrared image first, or the second camera component may be controlled to capture the speckle image 900 first.

It may be understood that the captured infrared image and the captured speckle image 900 correspond to each other. That is, a consistency between the infrared image and the speckle image 900 needs to be ensured. In a case where the first camera component and the second camera component operate in the time division manner, it may be required to ensure that an interval between time points of capturing the infrared image and the speckle image 900 is short enough. The interval between the first time point when the infrared image is captured and the second time point when the speckle image 900 is captured is less than the first threshold. Generally, the first threshold is a relatively small value. In response to detecting that the interval is less than the first threshold, it may be considered that the object to be captured does not change and the captured infrared image and the captured speckle image 900 correspond to each other. It may be understood that an adjustment may also be made based on a change regulation of the object to be captured. The faster the object to be captured changes, the smaller the first threshold is. In a case where the object to be captured is in a stationary state for a long time, the first threshold may be set to a relatively large value. In detail, a change speed of the object to be captured may be obtained and the first threshold may be obtained based on the change speed.

For example, in a case where it needs to authenticate the human face to unlock a phone, the user may click an unlocking key to initiate an unlocking instruction and make the front camera to focus on the human face. The phone may send the unlocking instruction to the first processing unit 30. The first processing unit 30 may control to power on the camera component 10. An infrared image may be captured by the first camera component and the second camera component may be controlled to capture a speckle image 900 after an interval of 1 millisecond. The authentication for unlocking may be performed based on the infrared image and the speckle image 900.

Further, the camera component 10 may be controlled to capture the infrared image at the first time point, while the camera component 10 may be controlled to capture the speckle image at the second time point. An interval between the first time point and the target time point is less than a second threshold and an interval between the second time point and the target time point is less than a third threshold. In response to detecting that the interval between the first time point and the target time point is less than the second threshold, the camera component 10 may be controlled to capture the infrared image. In response to detecting that the interval between the first time point and the target time point is greater than the second threshold, prompt information indicating a response timeout may be returned to the application and re-initiating by the application the image capturing instruction may be waited.

After the camera component 10 captures the infrared image, the first processing unit 30 may be configured to control the camera component 10 to capture the speckle image. An interval between the second time point when the speckle image 900 is captured and the first time point is less than the first threshold, and an interval between the second time point and the target time point is less than the third threshold. In response to detecting that the interval between the second time point and the first time point is greater than the first threshold, or in response to detecting that the interval between the second time point and the target time point is greater than the third threshold, the prompt information indicating the response timeout may be returned to the application and re-initiating by the application, the image acquisition instruction may be waited. It may be understood that the second time point of acquiring the speckle image 900 may be greater than, or less than the first time point of acquiring the infrared image, which is not limited herein.

In detail, the electronic device 100 may be provided with a floodlight controller and a laser controller. The first processing unit 30 may be connected to the floodlight controller and the laser controller through two channels of PWM (pulse width modulation) respectively. In response to controlling by the first processing unit 30 to power on the floodlight 114 or the laser 118, the first processing unit 30 may transmit a pulse wave through the PWM 32 to the floodlight controller to control to power on the floodlight 114 or transmit a pulse wave to the laser controller through a PWM 32 to control to power on the laser 118. The first processing unit 30 may be configured to control the interval between time points of capturing the infrared image and capturing the speckle image 900 by transmitting the pulse waves to the floodlight controller and the laser controller respectively through the PWM 32. The interval between the time points of capturing the infrared image and capturing the speckle image 900 is less than the first threshold, so that the consistency between the infrared image and the speckle image 900 may be ensured, thereby avoiding an error between the infrared image and the speckle image 900 and improving an accuracy of the image processing.

At block 0131, a reference image is acquired. The reference image is an image carrying reference depth information and obtained by calibration.

The electronic device 100 may be configured to calibrate the laser speckles in advance to obtain the reference image. The reference image may be stored in the electronic device 100. Generally, the reference image may be formed by illuminating a reference plane via the laser speckles. The reference image may be an image containing multiple speckles. Each speckle has reference depth information corresponding thereto. In a case where it is required to obtain the depth information of the object captured, the captured speckle image 900 may be compared with the reference image. The actual depth information may be obtained through a calculation based on an offset of the speckle of the captured speckle image 900.

Figures 5, 6:
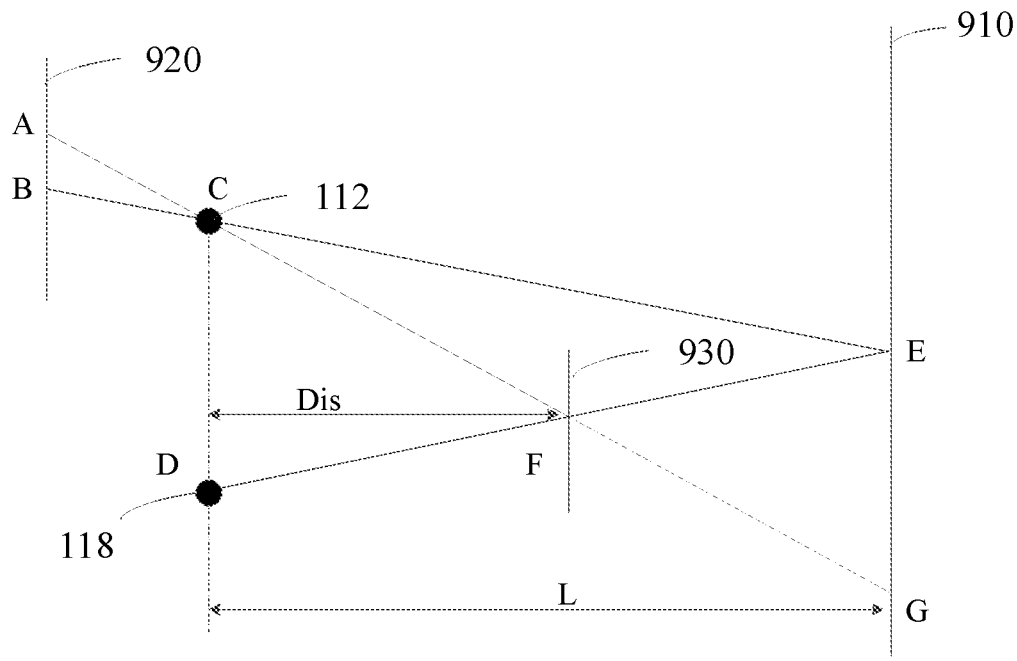
FIG. 5 is a schematic diagram illustrating a principle of calculating depth information according to some embodiments of the present disclosure.
FIG. 6 is a flowchart illustrating a method for processing an image according to some embodiments of the present disclosure.

FIG. 5 is a schematic diagram illustrating a principle of calculating depth information according to an embodiment of the present disclosure. As illustrated in FIG. 5, the laser 118 may generate the laser speckles. After the laser speckles are reflected by an object, an image may be captured by the laser camera 112. During a calibration of the camera, the laser speckles emitted by the laser 118 may be reflected by the reference plane 910. Reflected light may be collected by the laser camera 112, to generate the reference image on an imaging plane 920. A distance from the reference plane 910 to the laser 118 may be a reference depth L. The reference depth may be known. In a process of calculating the depth information, the laser speckles emitted by the laser 118 may be reflected by an object 930, the reflected light may be collected by the laser camera 112, and an actual speckle image may be generated on the imaging plane 920. A formula of calculating the actual depth information may be:

$$Dis = \frac{CD \times L \times f}{L \times AB + CD \times f} \qquad \text{Formula (1)}$$

where, L is a distance from the laser 118 to the reference plane 910, f is a focal length of a lens in the laser camera

112, CD is a distance from the laser 118 to the laser camera 112, and AB is an offset distance from an image of the object 930 to an image of the reference plane 910. AB may be a product of a pixel offset n and an actual distance p between pixels. In response to detecting that a distance D is from the object 930 to the laser 118 is greater than the distance L from the reference plane 910 to the laser 118, AB is negative. In response to detecting that the distance D is from the object 930 to the laser 118 is less than the distance L from the reference plane 910 to the laser 118, AB is positive.

At block 0132, offset information is obtained by comparing the reference image with the speckle image 900. The offset information is configured to represent a horizontal offset of a speckle of the speckle image 900 relative to a respective speckle of the reference image.

In detail, throughout each pixel (x, y) in the speckle image 900, a pixel block with a preset size may be selected by taking the respective pixel as a center. For example, the pixel block with a size of 31 pixels*31 pixels may be selected. A matched pixel block may be searched from the reference image. The horizontal offset between a coordinate of each matched pixel of the reference image and a coordinate of the pixel (x, y) may be calculated, where a rightward offset may be positive and a leftward offset may be negative. The calculated horizontal offset may be substituted into the formula (1) to obtain the depth information of the pixel (x, y). In this manner, depth information of each pixel of the speckle image 900 may be calculated. The depth information corresponding to each pixel of the speckle image 900 may be obtained.

At block 0133, the depth image is obtained through a calculation based on the offset information and the reference depth information. The depth image and the infrared image are determined as the target image.

The depth image may be configured to represent depth information corresponding to the infrared image. Each pixel of the depth image may represent a piece of depth information. In detail, each speckle of the reference image may correspond to a piece of reference depth information. After the horizontal offset between the speckle in the speckle image 900 and the speckle in the reference image is obtained, relative depth information of the object from the speckle image 900 to the reference plane may be obtained through a calculation based on the horizontal offset. The actual depth information from the object to the camera may be obtained through a calculation based on the relative depth information and the reference depth information, such that a final depth image may be obtained.

At block 0134, a corrected target image is obtained by correcting the target image under the secure execution environment.

In an embodiment, after the infrared image and the speckle image 900 are obtained, the depth image may be obtained through a calculation based on the speckle image 900. The infrared image and the depth image may be corrected respectively to obtain a corrected infrared image and a corrected depth image. The human face recognition may be performed based on the corrected infrared image and the corrected depth image. Correcting the infrared image and correcting the depth image respectively refers to correcting internal and external parameters of the infrared image and of the depth image. For example, in a case that the laser camera 112 deflects, an error caused by a deflection parallax may be corrected based on the obtained infrared image and obtained depth image to obtain a standard infrared image and a standard depth image. The corrected infrared image may be obtained after the infrared image is corrected. The corrected depth image may be obtained after the depth image is corrected. In detail, an infrared parallax image may be obtained through a calculation based on the infrared image. The internal and external parameters may be corrected based on the infrared parallax image to obtain the corrected infrared image. A depth parallax image may be obtained through a calculation based on the depth image. The internal and external parameters may be corrected based on the depth parallax image to obtain the corrected depth image.

At block 0135, the human face recognition may be performed based on the corrected target image.

The first processing unit 30 may transmit the depth image and the infrared image to the second processing unit 22 for the human face recognition after acquiring the depth image and the infrared image. The second processing unit 22 may be configured to correct the depth image and the infrared image to obtain the corrected depth image and the corrected infrared image before performing the human face recognition. The second processing unit 22 may be further configured to perform the human face recognition based on the corrected depth image and the corrected infrared image. The human face recognition may include a human face authentication stage and a living-body detection stage. The human face authentication stage refers to a process of recognizing an identity of a human face. The living-body detection stage refers to a process of recognizing whether the human face is a living body or not. In the human face authentication stage, the second processing unit 22 may be configured to perform human face detection on the corrected infrared image to detect whether a human face exists in the corrected infrared image. In response to detecting that the corrected infrared image contains a human face, a facial image contained in the corrected infrared image may be extracted. The extracted facial image may be matched with facial image stored in the electronic device 100. In response to determining that the extracted facial image matches with the facial image, the human face authentication is successful.

In response to matching the facial images, facial attribute features of the facial image may be extracted. The extracted facial attribute features may be matched with facial attribute features of the facial image stored in the electronic device 200. In response detecting that a matching value exceeds a matching threshold, it may be considered that the human face authentication is successful. For example, features such as a deflection angle, brightness information, facial features and the like of the human face in the facial image may be extracted as facial attribute features. In response to detecting that a matching degree between the extracted facial attribute features and the stored facial attribute features exceeds 90%, it may be considered that the human face authentication is successful.

Generally, in a process of authenticating the human face, whether the facial image is matched with a preset facial image may be authenticated based on the captured infrared image. In a case where a human face in an image or of a sculpture is captured, authentication may also be successful. Therefore, the living-body detection processing needs to be performed based on the captured depth image and the captured infrared image. Therefore, in response to determining that the obtained human face is a living body, it may be considered that the authentication is successful. It may be understood that the captured infrared image may represent details of the human face. The captured depth image may represent the depth information corresponding to the infrared image. Therefore, the living-body detection processing may be performed based on the depth image and the infrared image. For example, in a case where a photographed human face is a human face of an image, it may be determined from the depth image that the acquired human face is not stereoscopic, and it may be considered that the acquired human face is not a living body.

In detail, performing the living-body detection according to the above-described corrected depth image includes the following. Facial depth information corresponding to the facial image is searched from the corrected depth image. In response to determining that the facial depth information corresponding to the facial image exists in the depth image and the facial depth information conforms to a regulation of a stereoscopic human face, the facial image may be a living-body facial image. The regulation of a stereoscopic human face may be a rule having three-dimensional depth information of a human face. In an example, the second processing unit may be further configured to perform artificial intelligent recognition on the corrected infrared image and the corrected depth image by using an artificial intelligent model, obtain living-body attribute features corresponding to the facial image, and determine whether the facial image is the living-body facial image according to the obtained living-body attribute features. The living body attribute features may include skin features, texture directions, texture densities, texture widths, and the like corresponding to the facial image. In response to detecting that the living-body attribute features conform to a regulation of a living-body human face, the facial image may be considered to have biological activity, that is, the living-body human face image. It may be understood that in response to performing by the second processing unit 22, processing such as human face detection, human face authentication, or living-body detection, the processing sequence may be changed as necessary. For example, the human face may be authenticated first, and whether the human face is a living body may be detected. In an example, whether the human face is a living body may be detected first, and the human face may be authenticated.

A method of performing the living-body detection by the second processing unit 22 based on the infrared image and the depth image may include the following. Multiple infrared images and multiple depth images are obtained in sequence. It is detected whether the human face has corresponding depth information based on the infrared images and the depth images. In response to detecting that the human face has the corresponding depth information, it is detected whether the human face changes based on infrared images and depth images, such as whether the human face blinks, swings, opens the mouth and so on. In response to detecting that the human face has the corresponding depth information and the human face changes, it may be determined that the human face is a living body. In response to performing the human face recognition by the first processing unit 30, the first processing unit 30 may not perform the living-body detection in response to that the human face authentication is unsuccessful or not perform the human face authentication in response to that the living-body detection is unsuccessful.

At block 0141, the result of the human face recognition is encrypted, and an encrypted result of the human face recognition is sent to the target application initiating the image capturing instruction.

The result of the human face recognition is encrypted. An encryption algorithm is not limited. For example, the encryption algorithm may include a DES (data encryption standard), an MD5 (message-digest algorithm 5), and an HAVAL (Diffie-Hellman).

As illustrated in FIGS. 1 and 6, in an embodiment, the method for encrypting the result of the human face recognition in block 0141 may include the following.

At block 01411, a network security level of a network environment of the electronic device is obtained.

In a case where the application processes an image after obtaining the image, networking operation is generally required. For example, when the payment is performed by authenticating the human face, the result of human face recognition may be sent to the application. The application may send the result to a corresponding server to execute a corresponding payment operation. In response to sending the result of the human face recognition, the application needs to connected to a network and send the result of the human face recognition to the corresponding server through the network. Therefore, in response to sending the result of the human face recognition, the result of the human face recognition may be encrypted. The network security level of the network environment in which the electronic device 100 is currently located may be detected. The result may be encrypted based on the network security level.

At block 01422, an encryption level is obtained based on the network security level, and the result of the human face recognition is encrypted based on the encryption level.

The lower the network security level is, the lower the security of the network environment is and the higher the encryption level is. The electronic device 100 may establish a correspondence between the network security level and the encryption level in advance. The corresponding encryption level may be obtained based on the network security level. The result of the human face recognition may be encrypted based on the encryption level. The result of the human face recognition may be encrypted based on the acquired reference image. The result of the human face recognition may include one or more of a human face authentication result, the living-body detection result, the infrared image, the speckle image and the depth image.

The reference image is a speckle image captured when calibrating the camera component by the electronic device 100. The reference images captured by different electronic devices 100 may be different due to high uniqueness of the reference image. The reference image may be used as an encrypted key for encrypting data. The electronic device 100 may store the reference image in a secure environment to prevent data leakage. In detail, the acquired reference image is composed of a two-dimensional pixel matrix, each pixel corresponding to a pixel value. The result of the human face recognition may be encrypted based on all or part of the pixels of the reference image. For example, the reference image may be directly superimposed on the target image to obtain an encrypted image. In an example, a pixel matrix corresponding to the target image may be multiplied by a pixel matrix corresponding to the reference image to obtain an encrypted image. In another example, one or more of pixel values corresponding to one or more pixels of the reference image may be used as an encryption key to encrypt the target image. The specific encryption algorithm may be not limited in embodiments.

The reference image may be generated during the calibration by the electronic device 100. Therefore, the electronic device 100 may pre-store the reference image under a secure environment. In this manner, in response to encrypting the result of the human face recognition, the electronic device 100 may read the reference image under the secure environment and encrypt the result of the human face recognition based on the reference image. A same reference image may be stored in a server corresponding to the target application. After the electronic device 100 sends the encrypted result of the human face recognition to the server corresponding to the target application, the server of the target application may acquire the reference image and decrypt the encrypted result of the human face recognition based on the reference image.

It may be understood that the server of the target application may have multiple reference images captured by different electronic devices stored therein. The reference image corresponding to each electronic device 100 is different. Therefore, the server may define a reference image identifier for each reference image, store a device identifier of the electronic device 100, and establish a correspondence between the reference image identifier and the device identifier. In response to receiving by the server the result of the human face recognition, the result of the human face recognition may carry the device identifier of the electronic device 100. The server may search a reference image identifier based on the device identifier and find a reference image based on the reference image identifier. The result of the human face recognition may be decrypted based on the reference image.

In other embodiments according to the present disclosure, for the method for processing an image illustrated in FIG. 3 or FIG. 4, the method for encrypting based on the reference image may include the following. A pixel matrix corresponding to the reference image is acquired. An encryption key is acquired based on the pixel matrix. The result of the human face recognition is encrypted based on the encryption key.

In detail, the reference image may be composed of a two-dimensional pixel matrix. Since the acquired reference image is unique, the pixel matrix corresponding to the reference image is also unique. The pixel matrix may be used as the encryption key to encrypt the result of the human face recognition. In an example, the pixel matrix may be converted to obtain the encryption key and the result of the human face recognition may be encrypted with the encryption key obtained after the conversion. For example, the pixel matrix is a two-dimensional matrix composed of multiple pixel values. A position of each pixel value in the pixel matrix may be represented by a two-dimensional coordinate, such that a corresponding pixel value may be obtained based on one or more position coordinates. One or more of pixel values may be combined into the encryption key. After the encryption key is obtained, the result of the human face recognition may be encrypted based on the encryption key. The encryption algorithm may be not limited herein. For example, the encryption key may be directly superimposed on or multiplied with the data, or the encryption key may be inserted as a value into the data to obtain final encrypted data.

For encrypting the result of the human face recognition at block 0141, the electronic device 100 may apply different encryption algorithms to different applications. In detail, the electronic device 100 may establish a correspondence between an application identifier of the application and the encryption algorithm in advance. The image capturing instruction may include the target application identifier of the target application. After the image capturing instruction is received, the target application identifier contained in the image capturing instruction may be obtained. The encryption algorithm may be obtained based on the target application identifier, and the result of the human face recognition may be encrypted based on the encryption algorithm.

Accuracies of the infrared image, the speckle image, and the depth image may be adjusted before the infrared image, the speckle image, and the depth image are sent to the target application. In detail, FIG. 3 or the method for processing an image illustrated in FIG. 3 may further include the following. One or more of the infrared images, the speckle image 900 and the depth image may be determined as an image to be sent. An application level of the target application initiating the image capturing instruction may be obtained. An accuracy level may be obtained based on the application level. The accuracy of the image to be sent may be adjusted based on the accuracy level. The adjusted image to be sent may be sent to the target application.

The application level may represent a level of importance of the target application. Generally, the higher the application level of the target application, the higher the accuracy of the image. The electronic device 100 may preset the application level for the application, establish a correspondence between the application level and the accuracy level, and obtain the accuracy level based on the application level. For example, the application may correspond to four application levels, namely an application of a systematic security type, an application of a systematic non-security type, an application of a third-party security type and an application of a third-party non-security type, accuracy levels of the above applications are gradually reduced.

The accuracy of the image to be sent may be expressed as a resolution of the image, or the number of the speckles included in the speckle image 900. The accuracy of the depth image acquired may depend on the speckle images 900. In detail, adjusting the accuracy of the image may include the following. The resolution of the image to be sent is adjusted based on the accuracy level, or the number of the speckles included in the acquired speckle image 900 may be adjusted based on the accuracy level. The number of the speckles included in the speckle image may be adjusted by software or hardware. In a case where the adjustment is made by software, the speckles in the acquired speckle image 900 may be directly detected. Some of the speckles may be combined or eliminated, such that the number of the speckles included in the adjusted speckle image 900 may be reduced. In a case where the adjustment is made by hardware, the number of the laser speckles generated by the laser may be adjusted. For example, in a case where the accuracy is high, the number of generated laser speckles may be about 30,000. In a case where the accuracy is low, the number of generated laser speckles may be about 20,000. In this manner, the accuracy of the depth image calculated may be reduced accordingly.

In detail, different DOEs (diffractive optical element) may be preset in the laser 118. The number of speckles formed by diffraction of different DOEs may be different. The speckle image 900 may be generated due to the diffraction by switching among different DOEs based on the accuracy level. Depth images with different accuracies may be obtained based on the obtained speckle image 900. In response to detecting that the application level of the application is high, the corresponding accuracy level may be high, such that the laser may control the DOE having a great number of speckles to emit the laser speckles to obtain a speckle image having a great number of speckles. In response to detecting that the application level of the application is low, the corresponding accuracy level may be low, such that the laser 118 may control the DOE having a small number of speckles to emit the laser speckles to obtain a speckle image 900 having a small number of speckles.

As illustrated in FIGS. 1, 7 and 12, in the method for processing an image illustrated in FIG. 3 or FIG. 4, performing the human face recognition at block 013 may further include the following.

At block 0136, an execution environment located currently by the electronic device 100 is obtained.

At block 0137, in response to determining that the electronic device 100 is currently in a secure execution environment, the human face recognition is performed based on the target image under the secure execution environment.

The execution environment of the electronic device 100 may include a secure execution environment and a normal execution environment. For example, the execution environment of the CPU may include the TEE and the REE. The TEE is the secure execution environment and the REE is a non-secure execution environment. For an application operation requiring a high security, the application operation needs to be performed under the secure execution environment. For an application operation requiring a low security, the application operation may be performed under the non-secure execution environment.

At block 0138, in response to determining that the electronic device 100 is currently in the non-secure execution environment, the execution environment of electronic device 100 is switched from the non-secure execution environment to the secure execution environment and the human face recognition is performed based on the target image under the secure execution environment.

In an embodiment, the electronic device 100 may include a first processing unit 30 and a second processing unit 22. The first processing unit 30 may be an MCU, and the second processing unit 22 may be a CPU core. Since the MCU is external to the CPU, the MCU may be under the secure environment. In detail, in response to determining that the application operation corresponding to the image capturing instruction is a secure operation, it may be determined whether the first processing unit 30 is connected to the second processing unit in the secure execution environment. In response to determining that the first processing unit 30 is connected to the second processing unit in the secure execution environment, the image captured may be directly sent to the second processing unit 22 for processing. In response to determining that the first processing unit 30 is not connected to the second processing unit in the secure execution environment, the first processing unit 30 may be controlled to connect to the second processing unit 22 in the secure execution environment and the image captured may be sent to the second processing unit 22 for processing.

With the method for processing an image according to embodiments illustrated in FIGS. 3, 4, 6, and 7, in response to detecting the image capturing instruction and determining that the application operation corresponding to the image capturing instruction is the secure operation, it may be determined whether the time for responding to the instruction is overtime based on the timestamp included in the image capturing instruction. In response to determining that the time for responding to the instruction is not overtime, the image may be captured based on the image capturing instruction. The human face recognition may be performed on the image captured under the secure execution environment. The result of the human face recognition may be encrypted. The encrypted result of the human face recognition may be sent to the target application. Therefore, in a case that the target application performs the secure operation, the image may be processed in an environment with a high security level. The security of data may be improved with the encryption during a data transmission process, thereby improving the security of image processing.

As illustrated in FIGS. 1, 8 and 12, in another example, the block 001 may include a block 021, and the block 002 may include a block 022. The method for processing an image may include blocks 021 to 024.

At block 021, in response to detecting the image capturing instruction, it is determined whether the application operation corresponding to the image capturing instruction is a non-secure operation.

In an embodiment, the camera component 10 may be mounted on the electronic device 100. A camera included in the camera component 10 may be configured to capture an image. The camera may include a laser camera 112, a visible camera depending to images to be captured. The laser camera 112 may be configured to capture an image of an object illuminated by laser light. The visible camera may be configured to capture an image of an object illuminated by visible light. Several cameras may be mounted on the electronic device 100, and mounting positions are not limited. For example, one camera may be mounted on the front panel of the electronic device 100, while two cameras may be mounted on the back panel. In an example, the camera may be embedded into the electronic device 100 and may be activated in a rotation or sliding manner. In detail, the electronic device 100 may be provided with a front camera and a rear camera. The front camera and the rear camera may be configured to capture images from different views of field. Generally, the front camera may be configured to capture an image from a front view of the electronic device 100, while the rear camera may be configured to capture an image from a rear view of the electronic device 100.

The image capturing instruction may refer to an instruction for triggering an image capturing operation. For example, when the user unlocks a smart phone, the user may be verified to unlock the smart phone by capturing a facial image. When the user performs a payment operating through the smart phone, the facial image may be authenticated. The application operation may refer to an operation to be executed by the application. When the user opens the application, various application operations may be executed by the application. For example, the application operation may be a payment operation, a photographing operation, an unlocking operation, a game operation, or the like. An application operation requiring a high security may be determined as the secure operation, while an application operation requiring a low security may be determined as the non-secure operation.

At block 022, in response to determining that the application operation corresponding to the image capturing instruction is the non-secure operation, the camera component 10 is controlled to capture a speckle image based on the image capturing instruction.

A processing unit of the electronic device 100 may be configured to receive an instruction from an upper-level application. In response to determining that the processing unit receives the image capturing instruction, the processing unit may control the camera component 10 to capture the speckle image via the camera. The processing unit may be connected to the camera. The image captured by the camera may be transmitted to the processing unit. The image may be processed by the processing unit. For example, the image may be subjected to cutting, brightness adjustment, human face detection and human face recognition. In detail, the camera component 10 may include, but not limited to, a laser camera 112 and a laser 118. In response to receiving the image capturing instruction by the processing unit, the processing unit may control to power on the laser 118. In a case where the laser 118 is powered on, the speckle image

900 may be captured by the laser camera 112. The camera component 10 may further include a laser camera 112, a laser 118 and a floodlight 114. In response to receiving the image capturing instruction by the processing unit, the processing unit may control the laser 118 and the floodlight 114 to operate in a time division manner. In a case that the laser 118 is powered on, the speckle image 900 may be captured by the laser camera 112. In a case that the floodlight 114 is powered on, the infrared image may be captured by the laser camera 112.

It may be understood that when laser light is directed onto an optically rough surface having an average undulation greater than a magnitude of a wavelength, wavelets scattered by randomly distributed surface panels on these surfaces may be superimposed on each other, such that a reflected light field has a random spatial light intensity distribution and presents a grainy structure, which are laser speckles. The laser speckles may have a high randomness, and thus the laser speckles generated by the laser light emitted by different laser emitters (i.e., the laser 118) may be different. Speckle images 900 generated are different in a case that the formed laser speckles reach onto objects of different depths and shapes. The laser speckles formed by different laser emitters 112 are unique and the obtained speckle image 900 is unique. The laser speckles formed by the laser 118 may reach onto an object, such that the speckle image 900 of the object illuminated by the laser speckles may be captured by the laser camera 112.

In detail, the electronic device 100 may include a first processing unit 30 and a second processing unit 22. The first processing unit 30 may operate under a secure execution environment. The second processing unit 22 may operate under the secure execution environment or a non-secure execution environment. The first processing unit 30 and the second processing unit 22 may be processing units provided on different processors and may operate under different secure environments. The first processing unit 30 may operate under a first secure environment and the second processing unit 22 may operate under a second secure environment. For example, the first processing unit 30 may be an external MCU (microcontroller unit) module or a secure processing module in a DSP (digital signal processing). The second processing unit 22 may be a CPU (central processing unit) core. The CPU core may be under a TEE (trust execution environment) or a REE (rich execution environment).

In detail, in a case where the electronic device 100 needs to acquire data with a high security level, for example, in a case where the electronic device 100 needs to acquire data about human face for identification and verification, the CPU may operate under the TEE by switching the execution environment from the REE. In a case where the CPU of the electronic device 100 is a single-core CPU, the single-core CPU may operate under the TEE by switching the execution environment from the REE. In a case where the CPU of the electronic device 100 is a multi-core CPU, the electronic device 100 may switch the execution environment from the REE to the TEE for one core, while the remaining cores operate under the REE. The second processing unit 22 may receive the image capturing instruction sent by the application. The image capturing instruction may be sent to the first processing unit 30 and the first processing unit 30 may control the camera component to capture the speckle image.

At block 023, a depth image is acquired through a calculation based on the speckle image.

It may be understood that the laser 118 may emit several laser speckles. When the laser speckles reach onto objects at different distances, speckles may be displayed at different positions on the image. The electronic device 100 may capture a standard reference image in advance. Generally, the reference image may be an image of a plane illustrated by the laser speckles. The speckles on the reference image may be evenly distributed. A correspondence between each speckle on the reference image and a respective reference depth may be established. In a case where the speckle image 900 needs to be acquired, the laser 118 may be controlled to emit the laser speckle. After the laser speckles reach onto an object, the speckle image 900 may be captured by the laser camera 112. Each speckle on the speckle image 900 may be compared with a respective speckle on the reference image to obtain the position offset of the speckle on the speckle image 900 relative to the corresponding speckle on the reference image. Actual depth information corresponding to the speckles may be obtained based on the position offset of the speckle and the reference depth.

In detail, in the process of calculating the depth information based on the speckle image 900, a relative depth may be calculated based on the position offsets of the speckles on the speckle image 900 relative to the reference image. The relative depth may represent the depth information of the object captured from the reference plane. The actual depth information of the object may be obtained through a calculation based on the relative depth and the reference depth. The depth image may be configured to represent the depth information of the object captured. The depth information may be the relative depth of the object from the reference plane or an absolute depth of the object from the camera.

At block 024, the depth image is sent to the target application initiating the image capturing instruction. The depth image is configured to indicate the target application to execute the application operation The depth image may be sent to the target application. The target application may be configured to acquire the depth information of the object captured based on the depth image and perform the application operation based on the depth image. For example, the electronic device 100 may be configured to capture an RGB (Red Green Blue) image and a speckle image 900 simultaneously. The captured RGB image may correspond to the speckle image 900. Consequently, the depth image obtained through the calculation based on the speckle image 900 may correspond to the RGB image. After the target application acquires the RGB image and the depth image, a depth value corresponding to each pixel of the RGB image may be obtained based on the depth image. The RGB image may be processed with such as a three-dimensional modeling, AR (augmented reality) and retouching based on the depth value.

With the method for processing an image according to embodiments illustrated in FIG. 8, in response to detecting that the application operation corresponding to the application capturing instruction is the non-secure operation by the electronic device 100, the electronic device 100 may control the camera component 10 to capture the speckle image 900 based on the image capturing instruction. The depth image may be obtained through the calculation based on the speckle image 900. The depth image may be sent to the target application for performing the application. Therefore, the application operation corresponding to the image capturing instruction may be classified. Different operations may be performed depending on different image capturing instructions. In a case where the acquired image is used under the non-secure operation, the captured image may be directly processed, thereby improving an efficiency of image processing.

Figure 9:
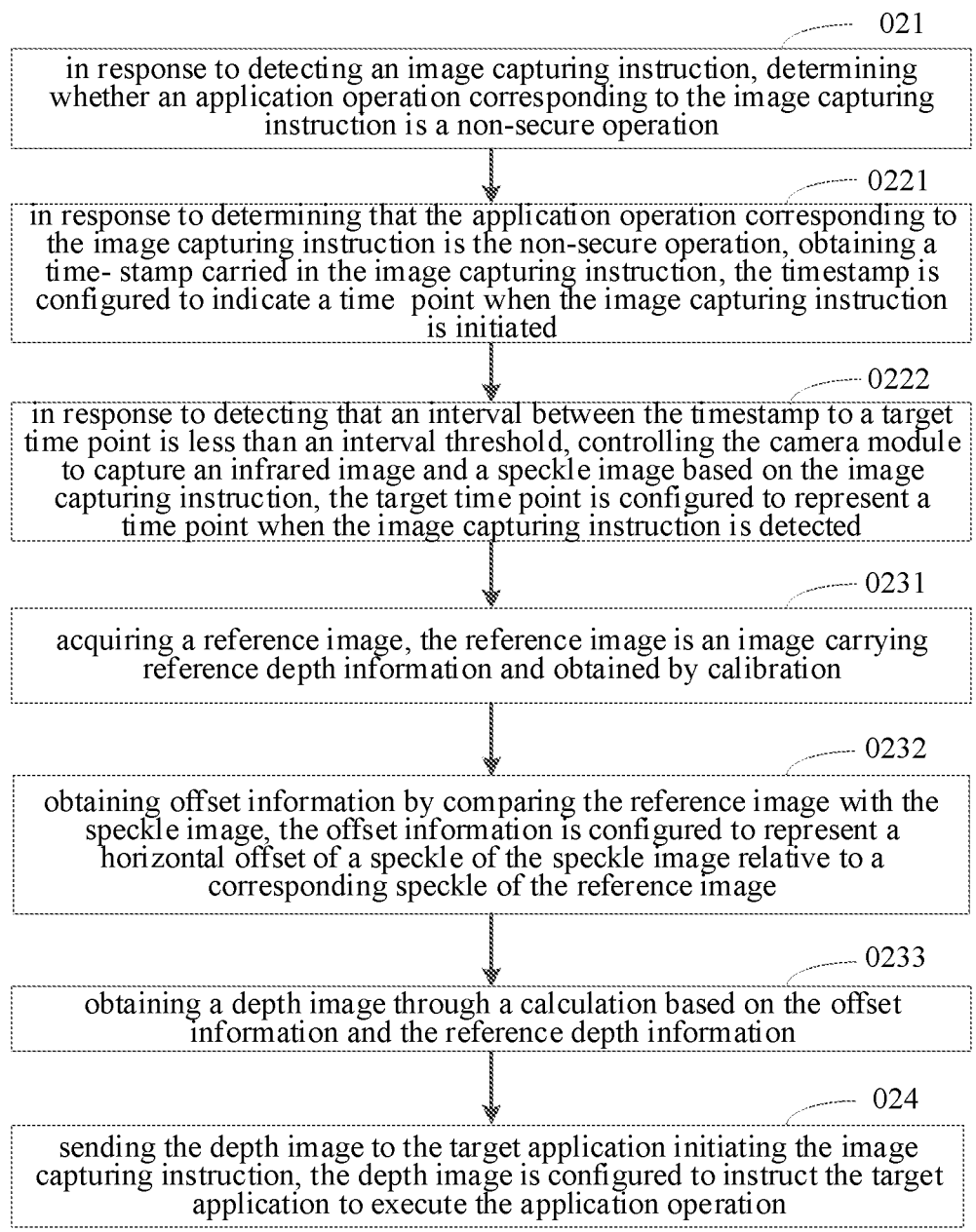
FIG. 9 is a flowchart illustrating a method for processing an image according to some embodiments of the present disclosure.

As illustrated in FIGS. 1, 9 and 12, in still another example, the block 022 may include a block 0221 and a block 0222, and the block 023 may include blocks 0231 to 0233.

At block 021, in response to detecting the image capturing instruction, it is determined whether the application operation corresponding to the image capturing instruction is the non-secure operation.

At block 0221, in response to determining that the application operation corresponding to the image capturing instruction is the non-secure operation, a timestamp included in the image capturing instruction is obtained. The timestamp is configured to indicate a time point when the image capturing instruction is initiated.

In detail, in response to sending the image capturing instruction by the application, the application may write a timestamp in the image capturing instruction. The timestamp is configured to record a time point when the application initiates the image capturing instruction. In response to receiving the image capturing instruction by the first processing unit 30, the first processing unit 30 may acquire the timestamp from the image capturing instruction and determine a time point when the image capturing instruction is generated based on the timestamp. For example, in response to initiating by the application, the image capturing instruction, the application may read the time point recorded by a clock of the electronic device 100 as the timestamp and write the timestamp into the image capturing instruction. For example, in an Android system, system time may be obtained through the function System.currentTimeMillis( ).

At block 0222, in response to detecting that an interval between the timestamp to the target time point is less than an interval threshold, the camera component 10 is controlled to capture the speckle image 900 based on the image capturing instruction. The target time is configured to represent a time point when the image capturing instruction is detected.

The target time point refers to a time point when the electronic device 100 detects the image capturing instruction. In detail, the target time point refers to a time point when the first processing unit 30 detects the image capturing instruction. The interval between the timestamp and the target time point refers to an interval from a time point when the image capturing instruction is initiated to a time point when the image capturing instruction is detected by the electronic device 100. In response to detecting that the interval exceeds the interval threshold, it may be considered that a response to the instruction is abnormal. Capturing the image may be stopped and an abnormal message may be returned to the application. In response to detecting that the interval is less than the interval threshold, the camera may be controlled to capture the speckle image 900.

In an embodiment, the camera component 10 may be composed of a first camera component and a second camera component. The first camera component may be configured to capture the RGB image. The second camera component may be configured to capture the speckle image 900. In a case where the application operation is performed based on the RGB image and the speckle image 900, it may be required to ensure that the RGB image and the speckle image 900 correspond to each other. Thus, the camera component 10 needs to be controlled to capture the RGB image and the speckle image 900 simultaneously. In detail, the first camera component may be controlled to capture the RGB image based on the image capturing instruction. The second camera component may be controlled to capture the speckle image 900 based on the image capturing instruction. The interval between a first time point of capturing the RGB image and a second time point of capturing the speckle image is less than a first threshold.

It may be understood that the captured RGB image and the captured speckle image 900 correspond to each other. That is, a consistency between the RGB image and the speckle image 900 needs to be ensured. In a case where the first camera component and the second camera component operate in the time division manner, it may be required to ensure that the interval between the time points of capturing the RGB image and the speckle image 900 is short enough. The interval between the first time point when the RGB image is capturing and the second time point when the speckle image is capturing may be less than the first threshold. Generally, the first threshold may be a relatively small value. In response to detecting that the interval is less than the first threshold, it may be considered that the object to be captured does not change and the captured RGB image correspond to the captured speckle image 900. It may be understood that an adjustment may also be made based on a change regulation of the object to be captured. The faster the object to be captured changes, the smaller the first threshold is. In a case where the object to be captured is in a stationary state for a long time, the first threshold may be set to a relatively large value. In detail, a change speed of the object to be captured may be obtained and the first threshold may be obtained based on the change speed.

For example, in a case that a face beautifying is performed with a phone, the user may click a photographing button to initiate a photographing instruction and make the face to be focused by a front camera for capturing. The phone may send the photographing instruction to the first processing unit 30. The first processing unit 30 may control the camera component 10 to operate. The first camera component may be configured to acquire the RGB image. The second camera component may be controlled to capture the speckle image 900 after an interval of 1 millisecond. The depth image may be obtained through a calculation based on the speckle image 900. The face beautifying is performed based on the RGB image and the depth image.

Further, the camera component 10 may be controlled to capture the RGB image at the first time point and capture the speckle image at the second time point. The interval between the first time point and the target time point may be less than a second threshold. The interval between the second time point and the target time point may be less than a third threshold. In response to detecting that the interval between the first time point and the target time point is less than the second threshold, the camera component 10 may be controlled to capture the RGB image. In response to detecting that the interval between the first time point and the target time point is greater than the second threshold, prompt information indicating a response timeout may be returned to the application and re-initiating by the application the image capturing instruction may be waited.

After the camera component 10 captures the RGB image, the first processing unit 30 may be configured to control the camera component 10 to capture the speckle image 900. An interval between the second time point when the speckle image 900 is captured and the first time point may be less than the first threshold and an interval between the second time point and the target time point may be less than a third threshold. In response to detecting that the interval between the second time point and the first time point is greater than the first threshold, or the interval between the second time point and the target time point is greater than the third threshold, the prompt information indicating the response timeout may be returned to the application and re-initiating the image capturing instruction by the application may be waited. It may be understood that the second time point of acquiring the speckle image 900 may be greater than or less than the first time point of capturing the RGB image, which is not limited herein.

At block 0231, the reference image is acquired. The reference image is an image carrying reference depth information obtained by calibration.

The electronic device 100 may be configured to calibrate the laser speckles in advance to obtain the reference image. The reference image may be stored in the electronic device 100. Generally, the reference image may be formed by illuminating a reference plane via the laser speckles. The reference image may be an image containing multiple speckles. Each speckle has reference depth information corresponding thereto. In a case that it is required to obtain the depth information of the object objected, the captured speckle image 900 may be compared with the reference image. The actual depth information may be obtained through a calculation based on an offset of the speckle of the captured speckle image 900.

FIG. 5 is a schematic diagram illustrating a principle of calculating depth information according to an embodiment of the present disclosure. As illustrated in FIG. 5, the laser 118 may generate the laser speckles. After the laser speckles are reflected by an object, an image may be captured by the laser camera 112. During a calibration of the camera, the laser speckles emitted by the laser 118 may be reflected by the reference plane 910. Reflected light may be collected by the laser camera 112, to generate the reference image on the imaging plane 920. A distance from the reference plane 910 to the laser 118 may be a reference depth L. The reference depth may be known. In a process of calculating the depth information, the laser speckles emitted by the laser 112 may be reflected by the object 930, the reflected light may be collected by the laser camera 112, and the speckle image may be obtained on the imaging plane 920. A formula for calculating the actual depth information may be:

$$Dis = \frac{CD \times L \times f}{L \times AB + CD \times f} \qquad \text{formula (2)}$$

where, L is the distance from the laser 118 to the reference plane 910, f is a focal length of a lens in the laser camera 112, CD is the distance from the laser 118 to the laser camera 112, and AB is an offset distance from an image of the object 930 to an image of the reference plane 910. AB may be a product of the pixel offset n and the actual distance p between pixels. In response to detecting that the distance D is from the object 930 to the laser 118 is greater than the distance L from the reference plane 910 to the laser 118, AB may be negative. In response to detecting that the distance D is from the object 930 to the laser 118 is less than the distance L from the reference plane 910 to the laser 118, AB may be positive.

At block 0232, offset information is obtained by comparing the reference image with the speckle image 900. The offset information is configured to represent a horizontal offset of a speckle of the speckle image 900 relative to a respective speckle of the reference image In detail, throughout each pixel (x, y) in the speckle image 900, a pixel block with the preset size may be selected by taking the pixel as a center. For example, a pixel block with the size of 31 pixels*31 pixels may be selected. A matched pixel block may be searched from the reference image. The horizontal offset between a coordinate of each matched pixel of the reference image and the coordinate of the pixel (x, y) may be calculated, where a rightward offset may be positive and a leftward offset may be negative. The calculated horizontal offset may be substituted into the formula (1) to obtain the depth information of the pixel (x, y). In this manner, the depth information of each pixel of the speckle image may be calculated. The depth information corresponding to each pixel of the speckle image 900 may be obtained.

At block 0233, the depth image is obtained through a calculation based on the offset information and the reference depth information.

The depth image may be configured to represent the depth information corresponding to the infrared image. Each pixel of the depth image may represent a piece of depth information. In detail, each speckle of the reference image may have a piece of reference depth information corresponding thereto. After the horizontal offset between the speckle of the speckle image 900 and the speckle of the reference image is obtained, relative depth information of the object from the speckle image 900 to the reference plane may be obtained through a calculation based on the horizontal offset. The actual depth information from the object to the camera may be obtained through a calculation based on the relative depth information and the reference depth information, such that a final depth image may be obtained.

At block 024, the depth image is sent to the target application initiating the image capturing instruction. The depth image is configured to indicate the target application to execute the application operation In an embodiment, after the depth image is acquired, a depth parallax image may be obtained through a calculation according to the depth image. The depth parallax image may be corrected to obtain the corrected depth image. The application operation may be performed based on the corrected depth image. Correcting the depth image refers to correcting internal and external parameters of the depth image. For example, in a case that the laser camera 112 deflects, it is required to correct the captured depth image to reduce an error caused by a deflection parallax to obtain a standard depth image. The depth image may be corrected to obtain the corrected depth image. In detail, the depth image may be corrected to obtain the corrected depth image. The corrected depth image may be sent to the target application that initiates the image capturing instruction. The depth parallax image may be obtained through a calculation based on the depth image and the internal and external parameters may be corrected based on the depth parallax image to obtain the corrected depth image.

Figure 10:
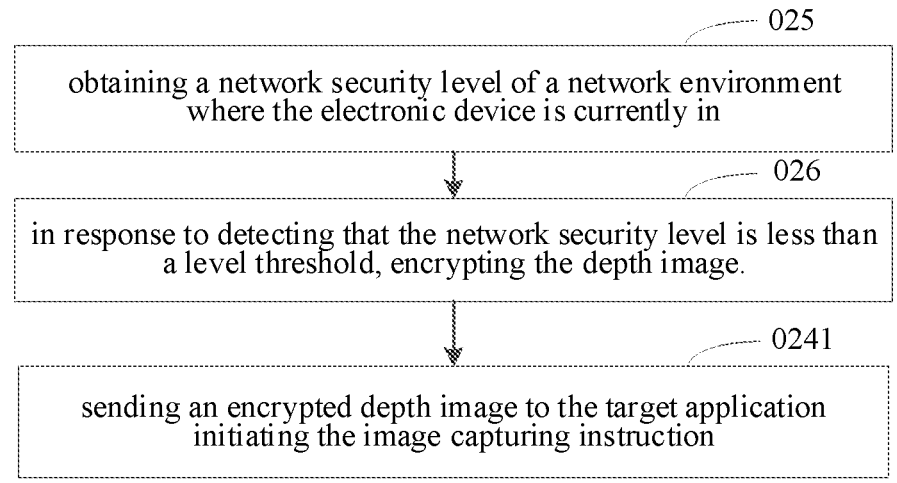
FIG. 10 is a flowchart illustrating a method for processing an image according to some embodiments of the present disclosure.

As illustrated in FIGS. 1, 10 and 12, in an embodiment, the method for processing an image illustrated in FIG. 8 or FIG. 9 may further include encrypting the depth image before sending the depth image. That is, the method for processing an image illustrated in FIG. 8 or FIG. 9 may further include a block 025 and a block 026. The block 024 may further include a block 0241.

At block 025, a network security level of the network environment located currently by the electronic device is obtained.

In response to acquiring an image for operating by the application, the application may need to perform a networking operation. For example, during three-dimensional modeling of the image, the RGB image and the depth image may be sent to a server of the application. The three-dimensional modeling may be performed on the server. Consequently, in response to sending the RGB image and the depth image, the application needs to be connected to a network and send the RGB image and the depth image to a corresponding server through the network. In order to prevent a malicious program from acquiring the depth image and performing a malicious operation on the depth image, the depth image may be subjected to the encryption processing before the image is sent.

At block 026, in response to detecting that the network security level is less than a level threshold, the depth image is encrypted.

In response to determining that the network security level is less than the level threshold, it may be considered that a security of the currently connected network is low. Under this condition that the security of the network environment is low, the depth image may be encrypted. In detail, an encryption level may be obtained based on the network security level. The depth image may be encrypted based on the encryption level. The electronic device 100 may establish a correspondence between the network security level and the encryption level in advance. The encryption level may be obtained based on the network security level and the result of the human face recognition may be encrypted based on the encryption level. The depth image may be encrypted based on the acquired reference image. The depth image is encrypted and AN encryption algorithm is not limited. For example, the encryption algorithm may include a DES (data encryption standard), an MD5 (message-digest algorithm 5) and an HAVAL (Diffie-Hellman).

The reference image may be a speckle image captured when the camera component 10 is calibrated by the electronic device 100. The reference images captured by different electronic devices 100 may be different due to high uniqueness of the reference image. The reference image may be used as an encrypted key for encrypting data. The electronic device 100 may store the reference image under the secure environment to prevent data leakage. In detail, the obtained reference image may be composed of a two-dimensional pixel matrix, each pixel having a pixel value corresponding thereto. The depth image may be encrypted based on all or part of the pixels of the reference image. For example, the reference image may be directly superimposed on the depth image to obtain an encrypted image. In an example, the pixel matrix of the depth image may be multiplied by the pixel matrix of the reference image to obtain an encrypted image. In another example, one or more of pixel values corresponding to one or more pixels of the reference image may be used as the encryption key to encrypt the depth image. The encryption algorithm may be not limited in embodiments.

The reference image may be generated during the calibration by the electronic device 100. Therefore, the electronic device 100 may pre-store the reference image under the secure environment. In this manner, in response to requiring to encrypt the depth image, the electronic device 100 may read the reference image under the secure environment and encrypt the depth image based on the reference image. A same reference image may be stored in a server corresponding to a depth application. After the electronic device 100 sends the encrypted depth image to the server corresponding to the target application, the server of the target application may acquire the reference image and decrypts the encrypted depth image based on the reference image.

It may be understood that the server of the target application may have multiple reference images captured by different electronic devices 100 stored thereon. The reference image corresponding to each electronic device 100 is different. Therefore, the server may define a reference image identifier for each reference image, store the device identifier of the electronic device 100, and establish the correspondence between the reference image identifier and the device identifier. In a case where the server receives the depth image, the depth image may carry the device identifier of the electronic device 100. The server may search the reference image identifier based on the device identifier and find the reference image based on the reference image identifier. The depth image may be decrypted based on reference image.

In other embodiments according to the present disclosure, for the method for processing an image illustrated in FIG. 8 or FIG. 9, the method for encrypting based on the reference image may include the following. The pixel matrix of the reference image is obtained. The encryption key is obtained based on the pixel matrix. The depth image is encrypted based on the encryption key.

In detail, the reference image may be composed of the two-dimensional pixel matrix. Since the reference image is unique, the pixel matrix corresponding to the reference image may be also unique. The pixel matrix may be used as the encryption key to encrypt the depth image, or may be converted to obtain the encryption key and the depth image may be encrypted with the encryption key after the conversion. For example, the pixel matrix may be the two-dimensional matrix composed of multiple pixel values. A position of each pixel value in the pixel matrix may be represented by a two-dimensional coordinate, such that that a corresponding pixel value may be obtained based on one or more position coordinates. One or more of pixel values may be combined into the encryption key. After the encryption key is obtained, the depth image may be encrypted based on the encryption key. The encryption algorithm may be not limited in embodiments. For example, the encryption key may be directly superimposed on or multiplied with the data, or the encryption key may be inserted as a value into the data to obtain final encrypted data.

For encrypting the depth image at block 026 in response to detecting that the network security level is less than the level threshold, the electronic device 100 may also apply different encryption algorithms for different applications. In detail, the electronic device 100 may establish a correspondence between the application identifier of the application and the encryption algorithm in advance. The image capturing instruction may carry the target application identifier of the target application. After the image capturing instruction is received, the target application identifier carried in the image capturing instruction may be obtained. The corresponding encryption algorithm may be obtained based on the target application identifier and the result of the human face recognition may be encrypted based on the encryption algorithm.

Accuracy of the depth image may be adjusted before the depth image is sent to the target application. In detail, the method for processing an image illustrated as FIG. 8 or FIG. 9 may further include the following. An application level of the target application initiating the image capturing instruction is obtained. An accuracy level is obtained based on the application level. The accuracy of the depth image is adjusted based on the accuracy level. The adjusted depth image is sent to the application. The application level may represent a level of importance of the target application. Generally, the higher the application level of the target application, the higher the accuracy of the image. The electronic device 100 may preset the application level of the application and establish the correspondence between the application level and the accuracy level. The accuracy level may be obtained based on the application level. For example, the application may correspond to four application levels, namely an application of a systematic security type, an application of a systematic non-security type, an application of a third-party security type and an application of a third-party non-security type, accuracy levels of the above applications are gradually reduced.

The accuracy of the depth image may be expressed as a resolution of the image, or the number of the speckles included in the speckle image. The accuracy of the depth image acquired may depend on the speckle image. In detail, adjusting the accuracy of the image may include the following. The resolution of the image to be sent may be adjusted based on the accuracy level, or the number of the speckle points included in the acquired speckle image 900 may be adjusted based on the accuracy level. The number of the speckles included in the speckle image 900 may be adjusted by software or hardware. In a case where the adjustment is made by software, the speckles in the acquired speckle image 900 may be directly detected. Some of the speckles may be combined or eliminated, to reduce the number of the speckles included in the adjusted speckle image 900. In a case where the adjustment is made by hardware, the number of the laser speckles generated by the laser 118 may be adjusted. For example, in response to determining that the accuracy is high, the number of laser speckles may be about 30,000. In response to determining that the accuracy is low, the number of laser speckles may be about 20,000. In this manner, the accuracy of the depth image calculated may be reduced accordingly.

In detail, different DOEs (diffractive optical element) may be preset in the laser 118. The number of speckles formed by diffraction of different DOEs may be different. The speckle images may be generated due to the diffraction by switching among different DOEs based on the accuracy level. The depth images with different accuracies may be obtained based on the speckle images 900. In response to detecting that the application level of the application is high, the corresponding accuracy level may be high, such that that the laser 118 may control the DOE having a great number of speckles to emit the laser speckles to obtain the speckle image 900 having a great number of speckles. In response to detecting that the application level of the application is low, the corresponding accuracy level may be low, such that the laser 118 may control the DOE having a small number of speckle points to emit the laser speckles to obtain the speckle image 900 having a small number of speckles.

Figure 11:
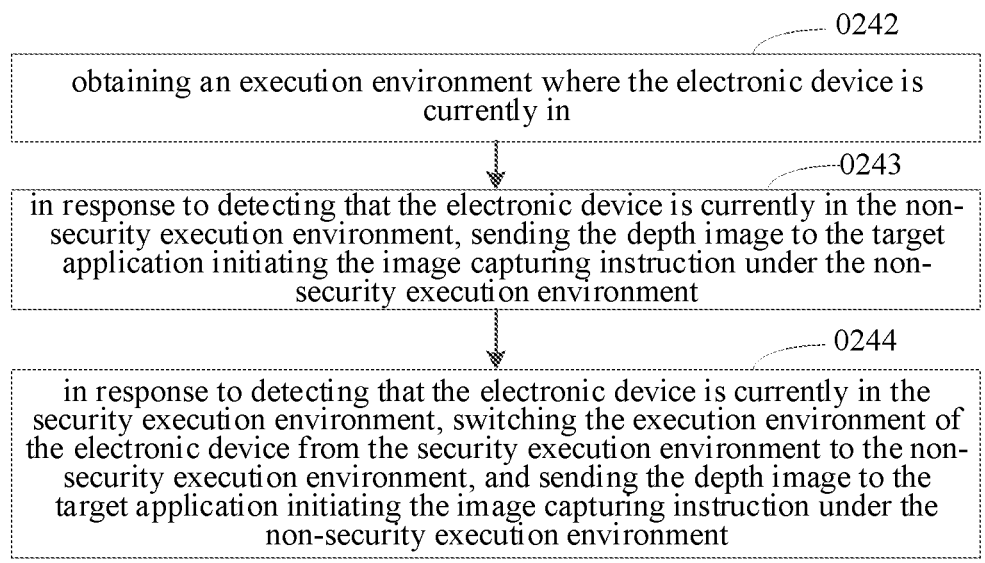
FIG. 11 is a flowchart illustrating a method for processing an image according to some embodiments of the present disclosure.

At block 0241, the encrypted depth image is sent to the target application initiating the image capturing instruction As illustrated in FIGS. 1, 11 and 12, in the method for processing an image illustrated as FIG. 8 or 9, sending the depth image at block 024 may further include the following.

At block 0242, an execution environment located currently by the electronic device 100 is obtained.

At block 0243, in response to detecting that the electronic device 100 is currently in a non-secure execution environment, the depth image is sent to the target application initiating the image capturing instruction under the non-secure execution environment.

The execution environment of the electronic device 100 may include the secure execution environment and the non-secure execution environment. For example, the execution environment of the CPU may include the TEE and the REE. The TEE is the secure execution environment. The REE is the non-secure execution environment. For an application operation requiring a high security, the application operate needs to be performed under the secure execution environment. For an application operation requiring a low security, the application operation may be performed under the non-secure execution environment. In response to detecting that the application operation corresponding to the image capturing instruction is the non-secure operation, the captured depth image may be sent to the target application under the non-secure execution environment.

At block 0244, in response detecting that the electronic device 100 is currently in the secure execution environment, the electronic device 100 switches the execution environment from the secure execution environment to the non-secure execution environment. The depth image is sent to the target application initiating the image capturing instruction under the non-secure execution environment.

In an embodiment, the electronic device 100 may include the first processing unit 30. The first processing unit 30 may be an MCU processor. Since the MCU processor is external to the CPU processor, the MCU may be under the secure execution environment. In detail, the first processing unit 30 may be connected to a secure transmission channel and a non-secure transmission channel. In response to detecting the image instruction by the first processing unit 30 and in response to determining that the application operation corresponding to the image capturing instruction is the non-secure operation, the first processing unit 30 may be connected to the non-secure transmission channel and may send the depth image through the non-secure transmission channel. The secure transmission channel is under the secure execution environment and has a high security level on the image processing. The non-secure transmission channel is under the non-secure execution environment and has a low security level on the image processing.

With the method for processing an image according to the embodiments illustrated in FIGS. 8 to 11, in response to detecting by the electronic device 100 that the application operation corresponding to the image capturing instruction is the non-secure operation, it may be determined whether the time of responding to the instruction is overtime based on the timestamp carried in the image capturing instruction. In response to determining that the time of responding to the instruction is not overtime, the camera component 10 may be controlled to capture the speckle image based on the image capturing instruction. The depth image may be obtained through a calculation based on the speckle image. The depth image may be sent to the target application to perform the application operation. Therefore, the application operations of the image capturing instruction may be classified and different application operations may be performed based on different image capturing instructions. In a case where the captured image is used for the non-secure operation, the captured image may be directly processed, thereby improving an efficiency of image processing.

It should be understood, although blocks in the flowcharts of FIGS. 2-4 and 6-11 are illustrated in sequence as indicated by arrows, the blocks are not necessarily performed in sequence as indicated by the arrows. Unless otherwise specifically specified in the specification, the execution of the blocks is not strictly limited, and the blocks may be performed in other sequences. Moreover, at least some of the blocks in FIGS. 2-4 and 6-11 may include several sub-blocks or stages, which are not necessarily performed simultaneously, but may be executed at different times. The execution sequence of these sub-blocks or stages is not necessarily performed sequentially, but may be performed alternately with at least a portion of other blocks, or sub-blocks or stages of other blocks.

FIG. 12 is a schematic diagram illustrating a hardware structure for implementing a method for processing an image according to any one of the above embodiments. As illustrated in FIG. 12, an electronic device 100 (illustrated as FIG. 1) may include a camera component 10, a CPU (central processing unit) 20 and a first processing unit 30. The camera component 10 may include the laser camera 112, a floodlight 114, an RGB (red/green/blue) camera 116 and a laser 118. The first processing unit 30 may include a PWM (pulse width modulation) module 32, a SPI/I2C (serial peripheral interface/inter-integrated circuit) module 34, a RAM (random access memory) module 36, and a depth engine module 38. A second processing unit 22 may be a CPU core under a TEE (trusted execution environment). The first processing unit 30 may be the MCU (microcontroller unit) processor. It may be understood that the CPU 20 may be in a multi-core mode of operation. The CPU core of the CPU 20 may operate under the TEE or a REE (rich execution environment). Both TEE and REE are operation modes of an ARM (advance reduced instruction set computing machines) module. Generally, the operation behavior requiring a high security level of the electronic device 100 needs to be performed under the TEE, and other operation behaviors may be performed under the REE. In embodiments of the present disclosure, in response to receiving by the CPU 20 the image capturing instruction initiated by the target application, the CPU core running under the TEE (i.e., the second processing unit 22) may send the image capturing instruction to the first processing unit 30 through the SPI/I2C module 34 of the MCU 730 via the SECURE SPI/I2C. After receiving the image capturing instruction, the first processing unit 30 may determine a security of the application operation corresponding to the image capturing instruction and control the camera component 10 to acquire an image corresponding to a determination result based on the determination result.

In an example, after receiving the image capturing instruction by the first processing unit and in response to determining that the application operation corresponding to the image capturing instruction is the secure operation, the first processing unit 30 may send a pulse wave through the PWM module 32 to control to power on the floodlight 114 in the camera component 10 to capture an infrared image and control to power on the laser 118 in the camera component 10 to capture a speckle image 900 (as illustrated in FIG. 1). The camera component 10 may send the captured infrared image and captured the speckle image 900 to the depth engine module 38 in the first processing unit 30. The depth engine module 38 may be configured to calculate an infrared parallax image based on the infrared image, calculate a depth image based on the speckle image 900, and obtain a depth parallax image based on the depth image. The infrared parallax image and the depth parallax image may be sent to the second processing unit 22 operating under the TEE. The second processing unit 22 may correct the infrared image based on the infrared parallax image to obtain a corrected infrared image and correct the depth image based on the depth parallax image to obtain a corrected depth image. The human face recognition may be performed based on the corrected infrared image. It may be detected whether a human face exists in the corrected infrared image and whether the detected human face is matched with a stored human face. In response to determining that human face passes the human face recognition, a living-body detection is performed based on the corrected infrared image and the corrected depth image to detect whether the human face is a living body. In an embodiment, after the corrected infrared image and the corrected depth image are obtained, the living-body detection may be performed before the human face recognition, or the human face recognition and the living-body detection may be performed simultaneously. After the human face passes the human face recognition and it is determined that the human face is the living body, the second processing unit 22 may send one or more of the corrected infrared image, the corrected depth image, and a result of the human face recognition to the target application.

In another example, after receiving the image capturing instruction by the first processing unit 30 and in response to determining that the application operation corresponding to the image capturing instruction is the non-secure operation, the first processing unit 30 may send a pulse wave through the PWM module 32 to control to power on the laser 118 in the camera component 10 to capture the speckle image 900. The camera component 10 may send the captured speckle image 900 to the depth engine module 38 in the first processing unit 30. The depth engine module 38 may be configured to calculate a depth image based on the speckle image 900 and obtain a depth parallax image based on the depth image. The depth image may be corrected based on the depth parallax image under the secure execution environment to obtain the corrected depth image. The corrected depth image may be sent to the target application.

Figure 13:
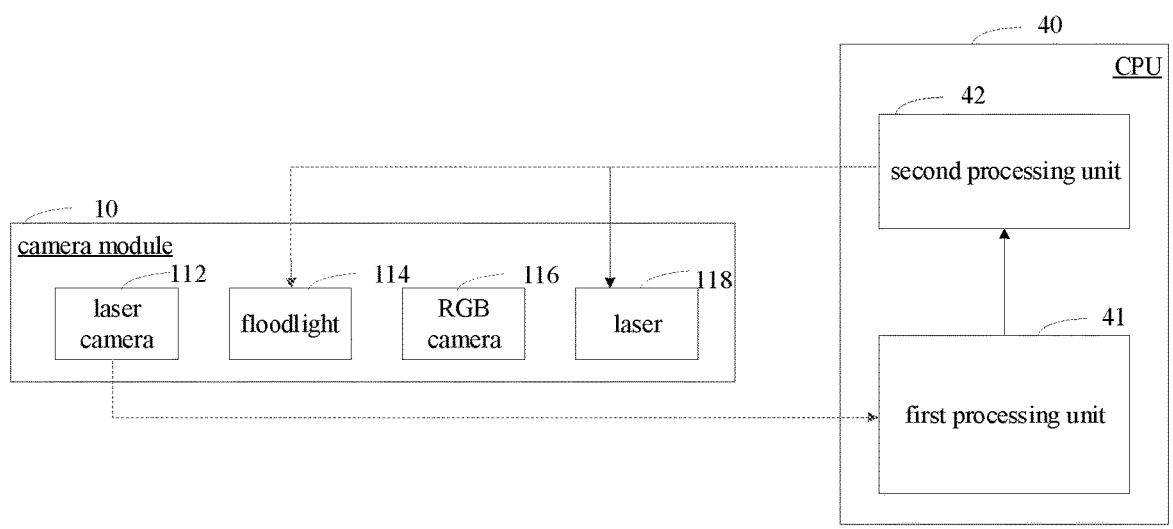
FIG. 13 is a schematic diagram illustrating a hardware structure for implementing a method for processing an image according to some embodiments of the present disclosure.

FIG. 13 is a schematic diagram illustrating a hardware structure for implementing a method for processing an image illustrated in FIG. 2, 3, 6, or 7 according to embodiments of the present disclosure. As illustrated in FIG. 13, the hardware structure may include the first processing unit 41, the camera component 10 and the second processing unit 42. The camera component 10 may include the laser camera 112, the floodlight 114, the RGB camera 116 and the laser 118. The CPU 40 may include the CPU core under the TEE and the CPU core under the REE. The first processing unit 41 may be a DSP module developed on the CPU 40. The second processing unit 42 is the CPU core under the TEE. The second processing unit 42 and the first processing unit 41 may be connected to each other through a secure buffer, thereby ensuring the security in an image transmission. Generally, in a case where the CPU 40 executes an operation behavior with a high security level, the execution environment of the processor core needs to be switched to the TEE. The operation behavior with a low security level may be executed under the TEE. In embodiments of the present disclosure, the second processing unit 42 may receive the image capturing instruction sent by an upper-level application. In response to determining that the application operation corresponding to the image capturing instruction received by the second processing unit 42 is the secure operation, the pulse wave may be transmitted by the PWM module to control to power on the floodlight 114 in the camera component 10 to capture the infrared image and further control to power on the laser 118 in the camera component 10 to capture the speckle image 900 (as illustrated in FIG. 1). The camera component 10 may send the capture infrared image and the capture speckle image 900 to the first processing unit 41. The first processing unit 41 may be configured to obtain the depth image through a calculation based on the speckle image 900. The depth parallax image may be obtained through a calculation based on the depth image. The infrared parallax image may be obtained through a calculation based on the infrared image. The infrared parallax image and the depth parallax image may be sent to the second processing unit 42. The second processing unit 42 may correct the infrared image based on the infrared parallax image to obtain the corrected infrared image and correct the depth image based on the depth parallax image to obtain the corrected depth image. The second processing unit 42 may perform the human face authentication based on the infrared image, detect whether a human face exists in the corrected infrared image, and detect whether the human face matches with the stored human face. When the human face passes the human face authentication, the living-body detection may be performed based on the corrected infrared image and the corrected depth image to determine whether the human face is a living body. After the second processing unit 42 performs the human face authentication and the living-body detection, a processing result may be sent to the target application. The target application may perform an application operation such as unlocking and payment based on the processing result.

Figure 14:
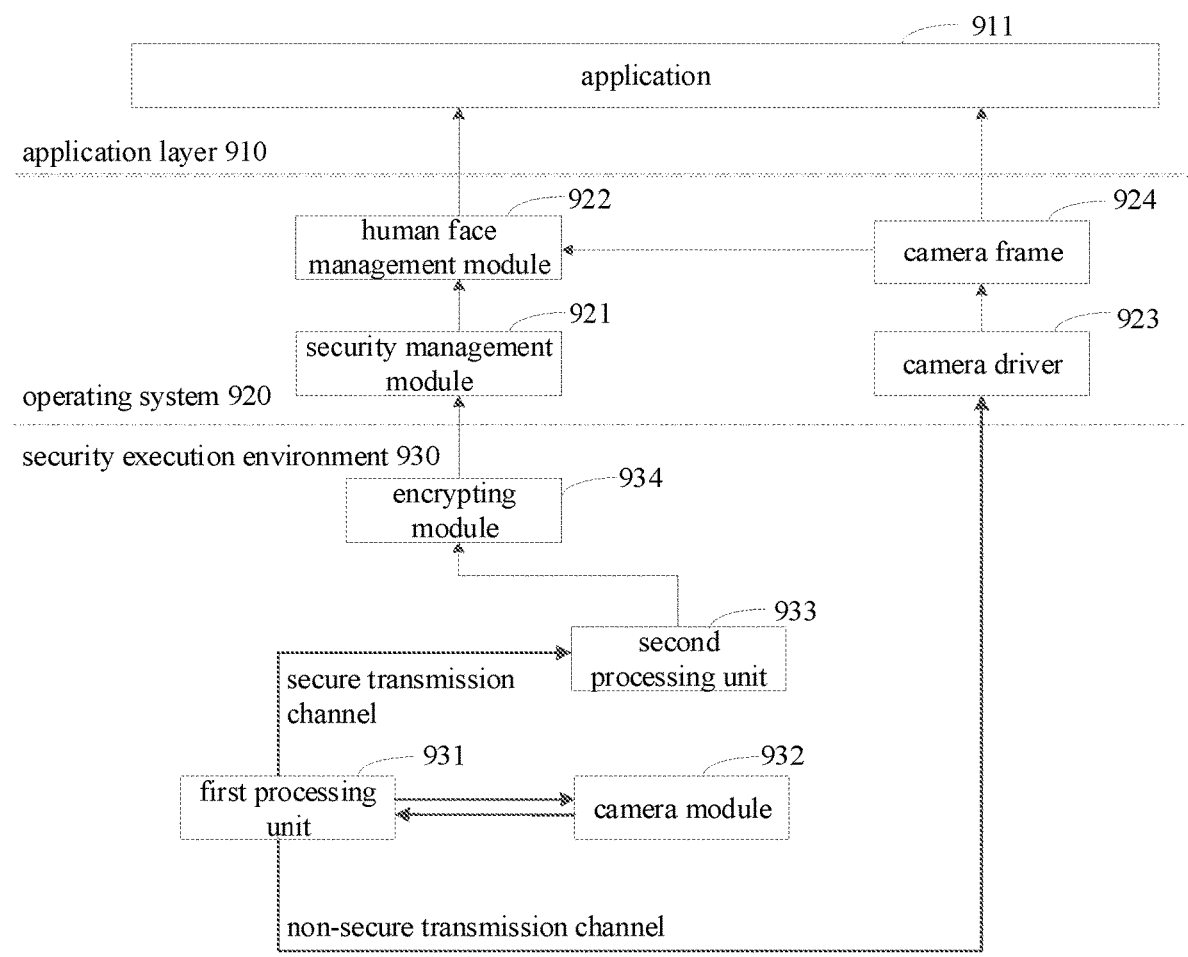
FIG. 14 is a schematic diagram illustrating a software architecture for implementing a method for processing an image according to some embodiments of the present disclosure.

FIG. 14 is a schematic diagram of a software architecture for implementing a method for processing an image according to any one of the above embodiments. As illustrated in FIG. 14, the software architecture may include an application layer 910, an operating system 920, and a secure execution environment 930. Modules under the secure execution environment 930 may include a first processing unit 931, a camera component 932, a second processing unit 933, an encryption module 934, and the like. The operating system 930 may include a security management module 921, a human face management module 922, a camera driver 923, and a camera frame 924. The application layer 910 may include an application 911. The application 911 may be configured to initiate the image capturing instruction and send the image capturing instruction to the first processing unit 931 for processing. For example, when operations such as payment, unlocking, face beautifying and AR (augmented reality) are performed by photographing a human face, the application may initiate the image capturing instruction for capturing a facial image. It may be understood that the image instruction initiated by the application 911 may be sent to the second processing unit 933 and the image instruction is sent to the first processing unit 931 by the second processing unit 933.

After receiving the image capturing instruction by the first processing unit 931, the first processing unit 931 may be configured to control the camera component 932 to capture the infrared image and the speckle image 900 (as illustrated in FIG. 1) based on the image capturing instruction, in response to determining that the application operation corresponding to the image capturing instruction is the secure operation (such as payment and unlocking). The infrared image and the speckle image 900 captured by the camera component 932 may be sent to the first processing unit 931. The first processing unit 931 may be configured to obtain the depth image carrying depth information through a calculation based on the speckle image 900, obtain the depth parallax image through a calculation based on the depth image, and obtain the infrared parallax image through a calculation based on the infrared image. The depth parallax image and the infrared parallax image may be sent to the second processing unit 933 through the secure transmission channel. The second processing unit 933 may be configured to correct the infrared image based on the infrared parallax image to obtain the corrected infrared image, and correct the depth image based on the depth parallax image to obtain the corrected depth image and performs the human face authentication based on the corrected infrared image to detect whether a human face exists in the corrected infrared image and whether the detected human face is matched with the stored human face. In response to detecting that the detected human face passes the human face authentication, the living-body detection may be performed based on the corrected infrared image and the corrected depth image to determine whether the human face is a living body. A result of the human face recognition obtained by the second processing unit 933 may be sent to the encryption module 934. After being encrypted by the encryption module 934, the encrypted result of the human face recognition may be sent to the security management module 921. Generally, different applications 911 may have different security management modules 921 corresponding thereto. The security management module 921 may decrypt the encrypted result of the human face recognition and send the decrypted result of the human face recognition after decryption to the human face management module 922 corresponding thereto. The human face management module 922 may be configured to send the result of the human face recognition to the upper-level application 911. The upper-level application 911 may be configured to execute the application operation based on the result of the human face recognition.

In response to detecting that the application operation corresponding to the image capturing instruction received by the first processing unit 931 is the non-secure operation (e.g., face beautifying or AR), the first processing unit 931 may be configured to control the camera component 932 to capture the speckle image 900, obtain the depth image through a calculation based on the speckle image 900, and obtain the depth parallax image based on the depth image. The first processing unit 931 may be configured to send the depth parallax image to the camera driver 923 through the non-secure transmission channel. The camera driver 923 may be configured to correct the depth image based on the depth parallax image to obtain the corrected depth image and send the corrected depth image to the camera frame 924. The camera frame 924 may be configured to send the corrected depth image to the human face management module 922 or the application 911.

Figure 15:
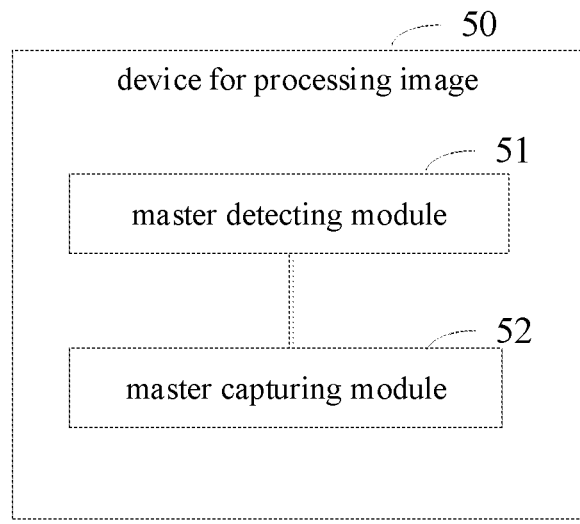
FIG. 15 is a block diagram illustrating a device for processing an image according to some embodiments of the present disclosure.

FIG. 15 is a schematic diagram illustrating a device 50 for processing an image according to an embodiment of the present disclosure. As illustrated in FIG. 15, the device 50 for processing an image may include master detecting module 501 and a master capturing module 502. The master detecting module 501 may be configured to, in response to detecting an image capturing instruction, determine a security of an application operation corresponding to the image capturing instruction. The master capturing module 502 may be configured to capture an image corresponding to a determination result based on the determination result.

Figure 16:
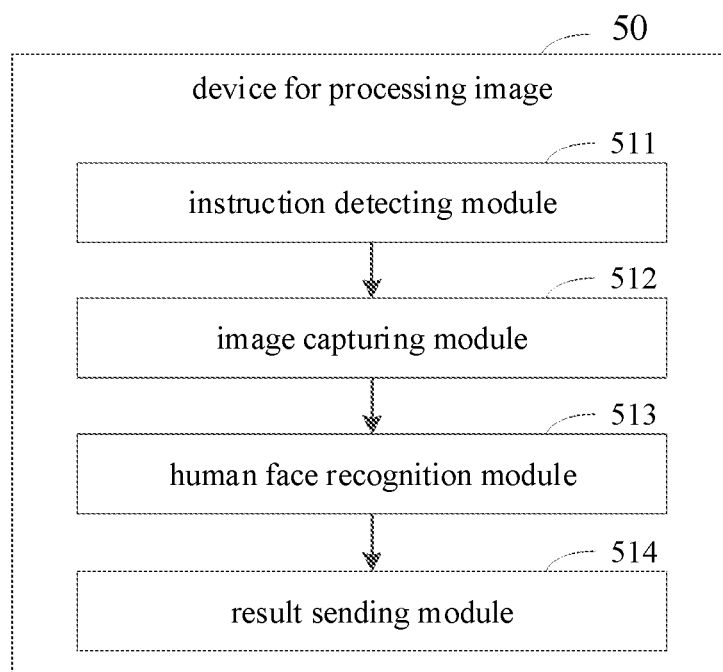
FIG. 16 is a block diagram illustrating a device for processing an image according to some embodiments of the present disclosure.

As illustrated in FIG. 16, in an embodiment, the master detecting module 501 may include an instruction detecting module 511 and the master capturing module 502 may include an image capturing module 512. The device 50 for processing an image may further include a human face recognition module 513 and a result sending module 514. The instruction detecting module 511 may be configured to determine whether the application operation corresponding to the image capturing instruction is a secure operation in response to detecting the image capturing instruction. The image capturing module 512 may be configured to control the camera component 10 to capture the infrared image and the speckle image 900 based on the image capturing instruction in response to detecting that the application operation corresponding to the image capturing instruction is the secure operation. The human face recognition module 513 may be configured to acquire the target image based on the infrared image and the speckle image 900 and perform the human face recognition based on the target image under the secure execution environment. The result sending module 514 may be configured to send a result of the human face recognition to the target application initiating the image capturing instruction. The result of the human face recognition may be used to indicate the target application to execute the application operation.

With the device 50 for processing an image according to embodiments illustrated in FIG. 16, it may be determined whether the application operation corresponding to the image capturing instruction is the secure operation in response to detecting the image capturing module. In response to determining that the application operation corresponding to the image capturing instruction is the secure operation, the infrared image and the speckle image 900 may be captured based on the image capturing instruction. The human face recognition may be performed on the captured image under the secure execution environment. The result of the human face recognition may be sent to the target application. Therefore, it may be ensured that the image is processed under an environment with a high security level in a case that the target application performs the secure operation, thereby improving the security of image processing.

In an embodiment, the image capturing module 512 may be further configured to obtain a timestamp carried in the image capturing instruction. The timestamp may be used to indicate a time point of initiating the image capturing instruction. In response to detecting that an interval duration between the timestamp and a target time point is less than an interval threshold, the camera component 10 may be controlled to capture the infrared image and the speckle image 900 based on the image capturing instruction. The target time point may be configured to represent a time point when the image capturing instruction is detected.

In an embodiment, the human face recognition module 513 may be further configured to acquire a reference image. The reference image may be an image carrying reference depth information and obtained by calibration. In addition, the human face recognition module 513 may be further configured to obtain offset information by comparing the reference image with the speckle image 900. The offset information may be configured to represent a horizontal offset of speckles of the speckle image 900 relative to the speckles of the reference image. Furthermore, the human face recognition module 513 may be further configured to obtain a depth image based on the offset information and the reference depth information and determine the depth image and the infrared image as the target images.

In an embodiment, the human face recognition module 513 may be further configured to acquire an execution environment located currently by the electronic device 100. In addition, the human face recognition module 513 may be further configured to, in response to determining that the electronic device 100 is currently in a secure execution environment, perform the human face recognition based on the target image under the secure execution environment. Furthermore, the human face recognition module 513 may be further configured to, in response to detecting that the electronic device 100 is currently in a non-secure execution environment, switch the execution environment of the electronic device 100 from the non-secure execution environment to the secure execution environment and perform the human face recognition based on the target image under the secure execution environment.

In an embodiment, the human face recognition module 513 may be further configured to obtain a corrected target image by correcting the target image under the secure execution environment and perform the human face recognition based on the corrected target image.

In an embodiment, the result sending module 514 may be further configured to encrypt the result of the human face recognition and to send an encrypted result of the human face recognition to the target application initiating the image capturing instruction.

In an embodiment, the result sending module 514 may be further configured to obtain a network security level of a network environment located currently by the electronic device, obtain an encryption level based on the network security level, and encrypt the result of the human face recognition based on the encryption level.

Figure 17:
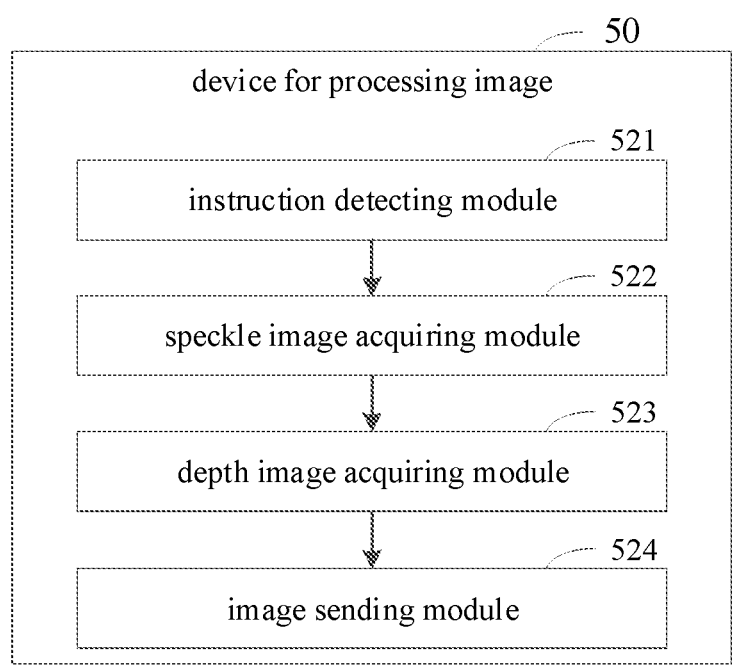
FIG. 17 is a block diagram illustrating a device for processing an image according to some embodiments of the present disclosure.

As illustrated in FIG. 17, in an embodiment, the master detecting module 501 may include an instruction detecting module 521 and the master capturing module 502 may include a speckle image acquiring module 522. The device 50 for processing an image may further include a depth image acquiring module 523 and an image sending module 524. The instruction detecting module 521 may be configured to determine whether an application operation corresponding to an image capturing instruction is a non-secure operation, in response to detecting the image capturing instruction. The speckle image acquiring module 522 may be configured to control the camera component 10 to acquire the speckle image based on the image capturing instruction, in response to detecting that the application operation corresponding to the image capturing instruction is the non-secure operation. The depth image acquiring module 523 may be configured to obtain the depth image through a calculation based on the speckle image. The image sending module 524 may be configured to send the depth image to a target application initiating the image capturing instruction. The depth image may be configured to indicate the target application to perform the application operation.

With the device 50 for processing an image according to embodiments illustrated in FIG. 17, in response to detecting that the application operation corresponding to the image capturing instruction is the non-secure operation, the electronic device 100 may be configured to control the camera component 10 to capture the speckle image based on the image capturing instruction. The depth image may be obtained through the calculation based on the speckle image 900. The depth image may be sent to the target application for performing the corresponding application operation. In this manner, the application operation corresponding to the image capturing instruction may be classified, and different operations may be performed based on different image capturing instructions. In response to detecting that the captured image is used for the non-secure operation, the captured image may be directly processed, thereby improving an efficiency of image processing.

In an embodiment, the speckle image acquiring module 522 may be further configured to acquire a timestamp carried in the image capturing instruction. The timestamp may be configured to represent a time point of initiating the image capturing instruction. In addition, the speckle image acquiring module 522 may be further configured to, in response to detecting that an interval from the timestamp to a target time point is less than an interval threshold, control the camera component 10 to capture the speckle image based on the image capturing instruction. The target time may be configured to represent a time point when the image capturing instruction is detected.

In an embodiment, the depth image acquiring module 523 may be further configured to acquire a reference image. The reference image may be an image carrying reference depth information and obtained by calibration. In addition, the depth image acquiring module 523 may be further configured to compare the reference image with the speckle image 900 to obtain offset information. The offset information may be configured to represent a horizontal offset of the speckle of the speckle image relative to a respective speckle of the reference image. Furthermore, the depth image acquiring module 523 may be further configured to obtain a depth image through a calculation based on the offset information and the reference depth information.

In an embodiment, the image sending module 524 may be further configured to obtain a corrected depth image by correcting the depth image and send the corrected depth image to the target application initiating the image capturing instruction.

In an embodiment, the image sending module 524 may be further configured to acquire an execution environment located currently by the electronic device 100, in response to detecting that the electronic device 100 is currently in the non-secure execution environment, send the depth image to the target application initiating the image capturing instruction under the non-secure execution environment, and in response to detecting that the electronic device 100 is currently in a secure execution environment, switch the execution environment of the electronic device 100 from the secure execution environment to the non-secure execution environment and send the depth image to the target application initiating the image capturing instruction under the non-secure execution environment.

In an embodiment, the image sending module 524 may be further configured to obtain a network security level of a network environment located currently by the electronic device 100; in response to detecting that the network security level is less than a level threshold, encrypting the depth image; and send an encrypted depth image to the target application initiating the image capturing instruction.

In an embodiment, the image sending module 524 may be further configured to obtain an encryption level based on the network security level and encrypt the depth image based on the encryption level.

The division of each module in the device 50 for processing an image is for illustration only, and in other embodiments, the device for processing an image may be divided into different modules as required to execute all or part of the functions of the device for processing an image.

Embodiments of the present disclosure further provide a computer readable storage medium. The computer readable storage medium has a computer program stored thereon. When the computer program is executed by a processor, the method for processing an image according to any one of the above embodiments may be executed.

Embodiments of the present disclosure further provide an electronic device (which may be the electronic device 100 as illustrated in FIG. 1). The electronic device may include a memory and a processor. The memory may have a computer readable instruction stored thereon. When the instruction is executed by the processor, the processor is configured to execute the method for processing an image according to any one of the above embodiments.

Embodiments of the present disclosure further provide a computer program product containing instructions. When the computer program product runs on a computer, the computer may be configured to execute the method for processing an image according to any one of the above embodiments.

Any reference to the memory, the storage, the database, or other media used herein may include a non-volatile and/or a volatile memory. The suitable non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), which acts as an external cache memory. By way of illustration, rather than limitation, the RAM is available in a variety of forms such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The above embodiments only represent several embodiments of the present disclosure. The description of the above embodiments is specific and detailed, but should not be construed as limiting the scope of the present disclosure. It should be noted that for those skilled in the art, several variations and modifications may be made without departing from the concept of the present disclosure, and the variations and modifications fall within the scope of the present disclosure. Therefore, the protection scope of the present disclosure shall be subject to the attached claims.

What is claimed is:

1. A method for processing an image, comprising:
in response to detecting an image capturing instruction, determining a security of an application operation corresponding to the image capturing instruction; and
capturing an image corresponding to a determination result based on the determination result:
further comprising:
in response to detecting that the application operation corresponding to the image capturing instruction is a secure operation, controlling the camera component to capture a speckle image based on the image capturing instruction; controlling the camera component to capture an infrared image based on the image capturing instruction;
acquiring a target image based on the speckle image; performing human face recognition based on the depth image and the infrared image under a secure execution environment; and sending a result of the human face recognition to a target application initiating the image capturing instruction, the result of the human face recognition being configured to indicate the target application to execute the application operation; and
in response to detecting that the application operation corresponding to the image capturing instruction is a non-secure operation, controlling the camera component to capture a speckle image based on the image capturing instruction; acquiring a depth image based on the speckle image; and sending the depth image to a target application initiating the image capturing instruction, the depth image being configured to indicate the target application to execute the application operation.

2. The method of claim 1, wherein controlling the camera component to capture the speckle image based on the image capturing instruction comprises:
obtaining a timestamp carried in the image capturing instruction, the timestamp being configured to represent a time point when the image capturing instruction is initiated; and
in response to detecting an interval between the timestamp and a target time point is less than an interval threshold, controlling the camera component to capture the speckle image based on the image capturing instruction, the target time point being configured to represent a time point when the image capturing instruction is detected.

3. The method of claim 2, further comprising:
in response to detecting that the application operation corresponding to the image capturing instruction is the secure operation and in response to detecting an interval between the timestamp and a target time point is less than an interval threshold, controlling the camera component to capture the infrared image based on the image capturing instruction.

4. The method of claim 1, wherein acquiring the depth image based on the speckle image comprises:
acquiring a reference image, the reference image being an image carrying reference depth information and obtained by calibration;
comparing the reference image with the speckle image to obtain offset information, the offset information being configured to represent a horizontal offset of a speckle of the speckle image relative to a corresponding speckle of the reference image; and
acquiring the depth image based on the offset information and the reference depth information.

5. The method of claim 1, wherein performing the human face recognition based on the depth image and the infrared image under the secure execution environment comprises:
obtaining an execution environment located currently by an electronic device;
in response to detecting that the electronic device is currently in the secure execution environment, performing the human face recognition based on the depth image and the infrared image under the secure execution environment; and
in response to detecting that the electronic device is currently in a non-secure execution environment, switching the execution environment of the electronic device from the non-secure execution environment to the secure execution environment, and performing the human face recognition based on the depth image and the infrared image under the secure execution environment.

6. The method of claim 1, wherein performing the human face recognition based on the depth image and the infrared image under the secure execution environment comprises:
obtaining a corrected depth image and a corrected infrared image by correcting the depth image and the infrared image under the secure execution environment; and
performing the human face recognition based on the corrected depth image and the corrected infrared image.

7. The method of claim 1, wherein sending the result of the human face recognition to the target application initiating the image capturing instruction comprises:
encrypting the result of the human face recognition to obtain an encrypted result, and sending the encrypted result to the target application initiating the image capturing instruction.

8. The method of claim 7, wherein encrypting the result of the human face recognition comprises:
obtaining a network security level of a network environment located currently by the electronic device; and
obtaining an encryption level based on the network security level and encrypting the result of the human face recognition based on the encryption level.

9. The method based on claim 1, wherein sending the depth image to the target application initiating the image capturing instruction comprises:
acquiring a corrected depth image by correcting the depth image and sending a corrected depth image to the target application initiating the image capturing instruction.

10. The method of claim 1, wherein sending the depth image to the target application initiating the image capturing instruction comprises:
obtaining an execution environment located currently by the electronic device;
in response to determining that the electronic device is currently in a non-secure execution environment, sending the depth image to the target application initiating the image capturing instruction under the non-secure execution environment; and
in response to detecting that the electronic device is currently in a secure execution environment, switching the execution environment of the electronic device from the secure execution environment to the non-secure execution environment, and sending the depth image to the target application initiating the image capturing instruction under the non-secure execution environment.

11. The method of claim 1, further comprising:
obtaining a network security level of a network environment located currently by the electronic device; and
in response to detecting that the network security level is less than a level threshold, encrypting the depth image to obtain an encrypted depth image; and
sending the encrypted depth image to the target application initiating the image capturing instruction.

12. The method of claim 11, encrypting the depth image comprises:
obtaining an encryption level based on the network security level, and encrypting the depth image based on the encryption level.

13. A non-transitory computer readable storage medium, having a computer program stored thereon, wherein, when the computer program is executed by a processor, a method for processing an image is executed, the method comprising:
in response to detecting an image capturing instruction, determining a security of an application operation corresponding to the image capturing instruction; and
capturing an image corresponding to a determination result based on the determination result;
the method further comprising:
in response to detecting that the application operation corresponding to the image capturing instruction is a secure operation, controlling the camera component to capture a speckle image based on the image capturing instruction; controlling the camera component to capture an infrared image based on the image capturing instruction; acquiring a depth image based on the speckle image; performing human face recognition based on the depth image and the infrared image under a secure execution environment; and sending a result of the human face recognition to a target application initiating the image capturing instruction, the result of the human face recognition being configured to indicate the target application to execute the application operation; and
in response to detecting that the application operation corresponding to the image capturing instruction is a non-secure operation, controlling the camera component to capture a speckle image based on the image capturing instruction; acquiring a depth image based on the speckle image; and sending the depth image to a target application initiating the image capturing instruction, the depth image being configured to indicate the target application to execute the application operation.

14. An electronic device, comprising a memory and a processor, the memory having a computer readable instruction stored thereon, wherein, when the instruction is executed by the processor, the processor is configured to:
in response to detecting an image capturing instruction, determine a security of an application operation corresponding to the image capturing instruction; and
capture an image corresponding to a determination result based on the determination result;
wherein the processor is further configured to:
in response to detecting that the application operation corresponding to the image capturing instruction is a secure operation, control the camera component to capture a speckle image based on the image capturing instruction; control the camera component to capture an infrared image based on the image capturing instruction; acquire a depth image based on the speckle image; perform human face recognition based on the depth image and the infrared image under a secure execution environment; and send a result of the human face recognition to a target application initiating the image capturing instruction, the result of the human face recognition being configured to indicate the target application to execute the application operation; and
in response to detecting that the application operation corresponding to the image capturing instruction is a non-secure operation, control the camera component to capture a speckle image based on the image capturing instruction; acquire a depth image based on the speckle image; and send the depth image to a target application initiating the image capturing instruction, the depth image being configured to indicate the target application to execute the application operation.

15. The electronic device of claim 14, wherein the processor is configured to control the camera component to capture the speckle image based on the image capturing instruction by:
obtaining a timestamp carried in the image capturing instruction, the timestamp being configured to represent a time point when the image capturing instruction is initiated; and
in response to detecting an interval between the timestamp and a target time point is less than an interval threshold, controlling the camera component to capture the speckle image based on the image capturing instruction, the target time point being configured to represent a time point when the image capturing instruction is detected.

16. The electronic device of claim 15, wherein the processor is further configured to:
in response to detecting that the application operation corresponding to the image capturing instruction is the secure operation and in response to detecting an interval between the timestamp and a target time point is less than an interval threshold, control the camera component to capture the infrared image based on the image capturing instruction.

17. The electronic device of claim 14, wherein the processor is configured to acquire the depth image based on the speckle image by:
acquiring a reference image, the reference image being an image carrying reference depth information and obtained by calibration;
comparing the reference image with the speckle image to obtain offset information, the offset information being configured to represent a horizontal offset of a speckle of the speckle image relative to a corresponding speckle of the reference image; and
acquiring the depth image based on the offset information and the reference depth information.

* * * * *